United States Patent
Ezawa et al.

(10) Patent No.: US 11,958,633 B2
(45) Date of Patent: Apr. 16, 2024

(54) ARTIFICIAL SATELLITE AND CONTROL METHOD THEREOF

(71) Applicant: SONY GROUP CORPORATION, Tokyo (JP)

(72) Inventors: Satoshi Ezawa, Tokyo (JP); Itaru Shimizu, Tokyo (JP); Naomi Kurahara, Tokyo (JP); Kazuo Ishigame, Tokyo (JP); Tetsu Ogawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 209 days.

(21) Appl. No.: 17/616,466

(22) PCT Filed: May 29, 2020

(86) PCT No.: PCT/JP2020/021287
§ 371 (c)(1),
(2) Date: Dec. 3, 2021

(87) PCT Pub. No.: WO2020/250709
PCT Pub. Date: Dec. 17, 2020

(65) Prior Publication Data
US 2022/0242593 A1  Aug. 4, 2022

(30) Foreign Application Priority Data
Jun. 12, 2019  (JP) .................. 2019-109285

(51) Int. Cl.
*B64G 1/10* (2006.01)
*B64G 1/24* (2006.01)
(Continued)

(52) U.S. Cl.
CPC ............. *B64G 1/1021* (2013.01); *B64G 1/24* (2013.01); *B64G 1/66* (2013.01); *H04B 7/18521* (2013.01);
(Continued)

(58) Field of Classification Search
CPC ........................ B64G 1/1021; B64G 1/1028
See application file for complete search history.

(56) References Cited

U.S. PATENT DOCUMENTS

| 9,651,946 | B1 | 5/2017 | Rubel et al. |
| 2018/0251239 | A1 | 9/2018 | Blanc-Paques |
| 2020/0259985 | A1* | 8/2020 | Takahashi ............. G03B 13/16 |

FOREIGN PATENT DOCUMENTS

| CA | 2993926 A1 | 2/2017 |
| CA | 3028666 A1 | 1/2018 |

(Continued)

OTHER PUBLICATIONS

International Search Report and Written Opinion of PCT Application No. PCT/JP2020/021287, dated Jul. 14, 2020, 08 pages of ISRWO.

*Primary Examiner* — Nicholas McFall
(74) *Attorney, Agent, or Firm* — CHIP LAW GROUP

(57) ABSTRACT

The present technology relates to an artificial satellite and a control method thereof that enable to ensure quality of a captured image while suppressing battery consumption. An artificial satellite includes: an imaging device configured to perform imaging of a predetermined region on the ground; and a management unit configured to change accuracy of attitude control in accordance with a remaining battery amount at an instructed imaging time, and configured to change an imaging condition in accordance with accuracy of the attitude control. The present technology can be applied (Continued)

to, for example, an artificial satellite or the like that performs satellite remote sensing by formation flight.

10 Claims, 17 Drawing Sheets

(51) Int. Cl.
  *B64G 1/66* (2006.01)
  *H04B 7/185* (2006.01)
(52) U.S. Cl.
  CPC .......... *B64G 1/1028* (2023.08); *B64G 1/1035* (2023.08); *B64G 1/245* (2023.08)

(56) References Cited

FOREIGN PATENT DOCUMENTS

| | | |
|---|---|---|
| CN | 106972581 A | 7/2017 |
| CN | 107949521 A | 4/2018 |
| EP | 3328736 A1 | 6/2018 |
| EP | 3478585 A1 | 5/2019 |
| JP | 2004-015451 A | 1/2004 |
| JP | 2018-522775 A | 8/2018 |
| WO | 2010/097921 A1 | 9/2010 |
| WO | 2017/017384 A1 | 2/2017 |
| WO | 2018/004825 A1 | 1/2018 |

\* cited by examiner

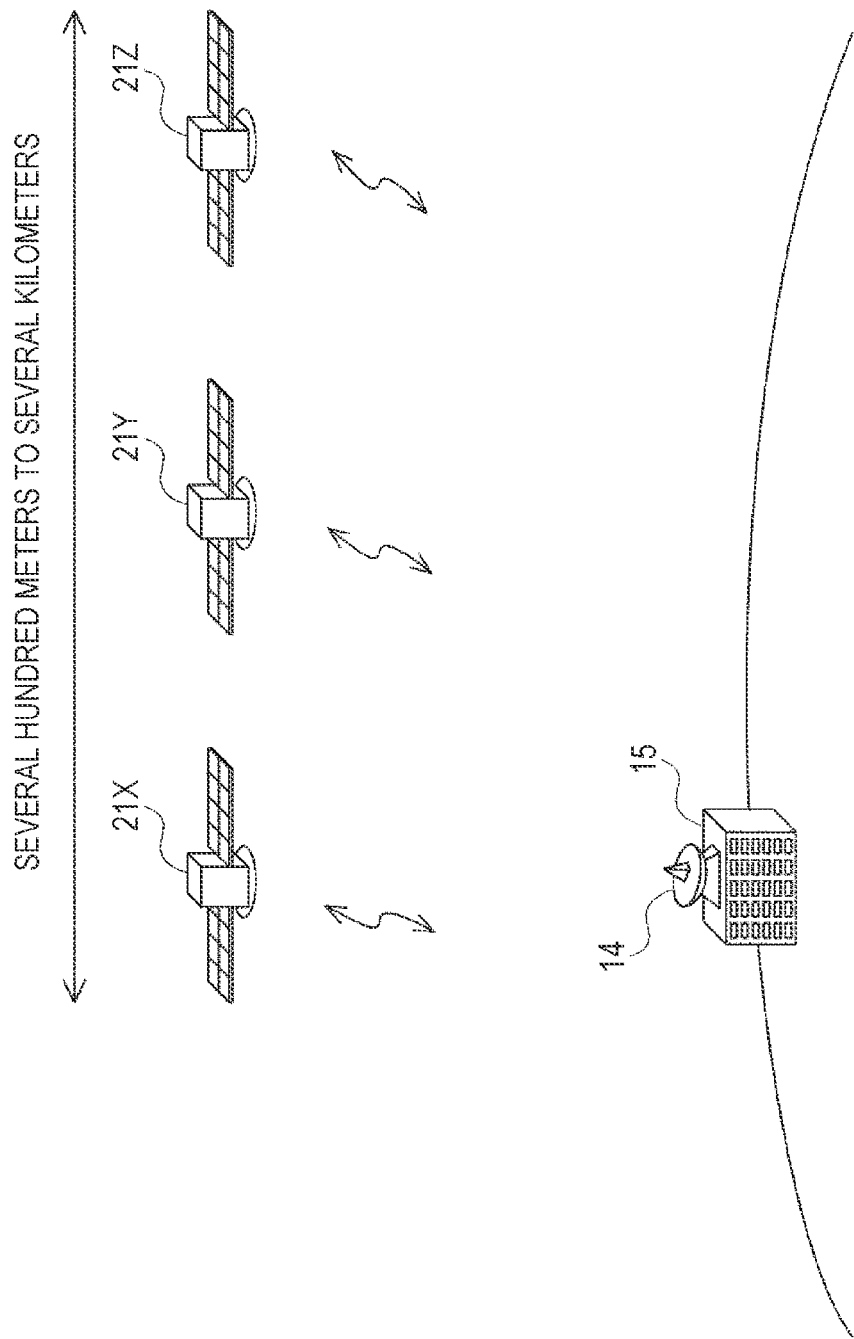

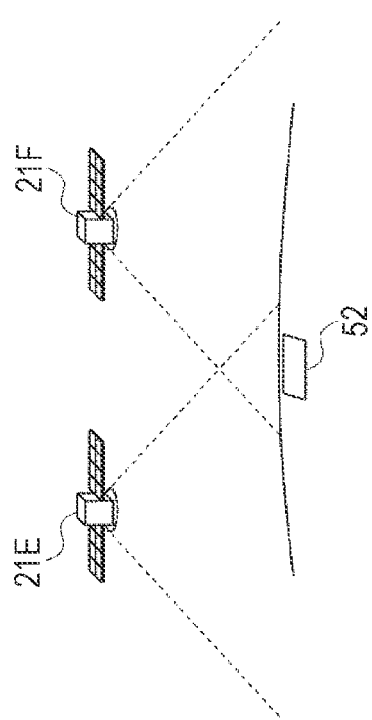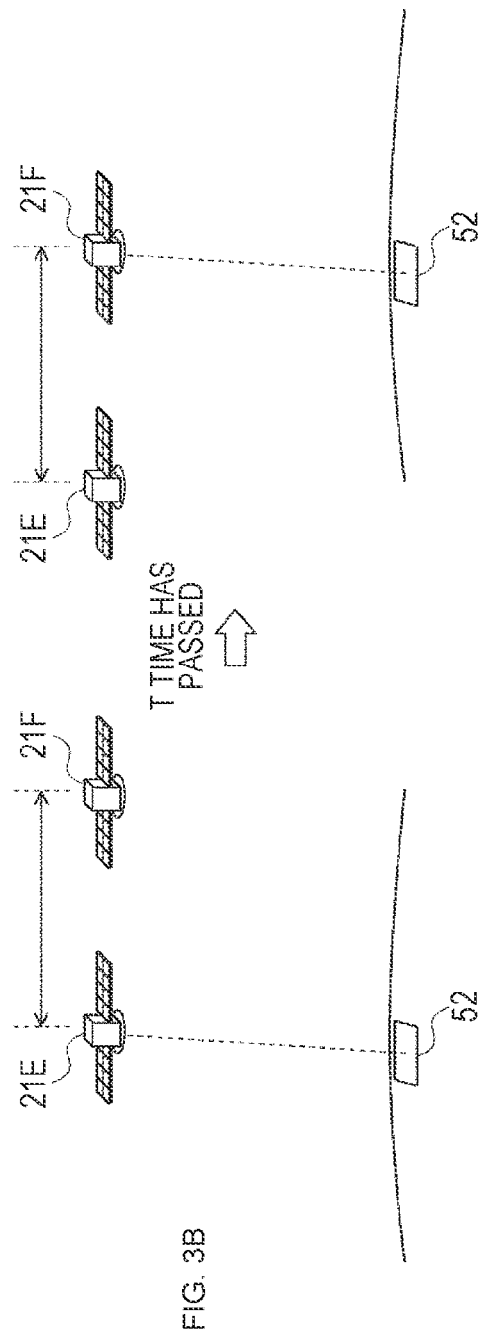
FIG. 3A
FIG. 3B

FIG. 10

| | ARTIFICIAL SATELLITE | MANAGEMENT DEVICE | ANALYSIS SERVER |
|---|---|---|---|
| ·INFORMATION FOR SPECIFYING SATELLITE | | | |
| ·GROUP ID | O | O | |
| ·INDIVIDUAL ID | O | O | |
| ·RELATIVE POSITION INFORMATION | O | O | |
| ·ANGLE INFORMATION OF SELF | O | O | |
| ·SATELLITE TYPE (OPTICAL SATELLITE, SAR SATELLITE, APPLICATION, SIZE) | O | O | |
| ·TLE INFORMATION, GPS INFORMATION ORBITAL POSITION/ORBITAL ALTITUDE INFORMATION | O | O | |
| ·SPEED INFORMATION | O | O | |
| ·SENSOR INFORMATION | O | O | |
| ·INFORMATION REGARDING IMAGING CONTENTS | | | |
| ·IMAGING TARGET POSITION INFORMATION | O | O | |
| ·IMAGING CONDITIONS | O | O | |
| ·SENSOR TYPE | O | O | |
| ·IMAGING TIME | O | O | |
| ·SATELLITE POSITION AT A TIME OF IMAGING | | O | |
| ·WEATHER INFORMATION (CLOUD COVER/SUNSHINE AMOUNT) | O | O | |
| ·INFORMATION REGARDING IMAGE TYPE | | | |
| ·BAND INFORMATION | O | O | O |
| ·WAVELENGTH INFORMATION | O | O | O |
| ·RGB (True color)/IR/MONOCHROME | O | | O |
| ·COLORING INFORMATION: INFORMATION THAT SPECIFICATION TARGET SUCH AS PLANT IS COLORED (False color) | | | O |
| ·ANALYSIS INFORMATION: NDVI IMAGE, NDWI IMAGE | | O | O |
| ·IMAGE PROCESSING INFORMATION | | | |
| ·PROCESSING TIME | | O | O |
| ·PROCESSING LEVEL (L0, L1,..., L5) | | O | O |
| ·RADIOMETRIC CORRECTION (L1) GEOMETRIC CORRECTION (L2) MAP PROJECTION, ORTHO-CORRECTION | | O | O |
| ·PROCESSING METHOD SUCH AS PAN-SHARPING PROCESSING, TRUE-COLOR SYNTHESIS PROCESSING, AND SAR IMAGE SYNTHESIS PROCESSING | | O | O |
| ·INFORMATION REGARDING RELATED PERSON | | | |
| ·OWNER OF SATELLITE | | O | O |
| ·SERVICE OPERATOR | | O | O |
| ·RIGHT HOLDER OF IMAGE | | O | O |

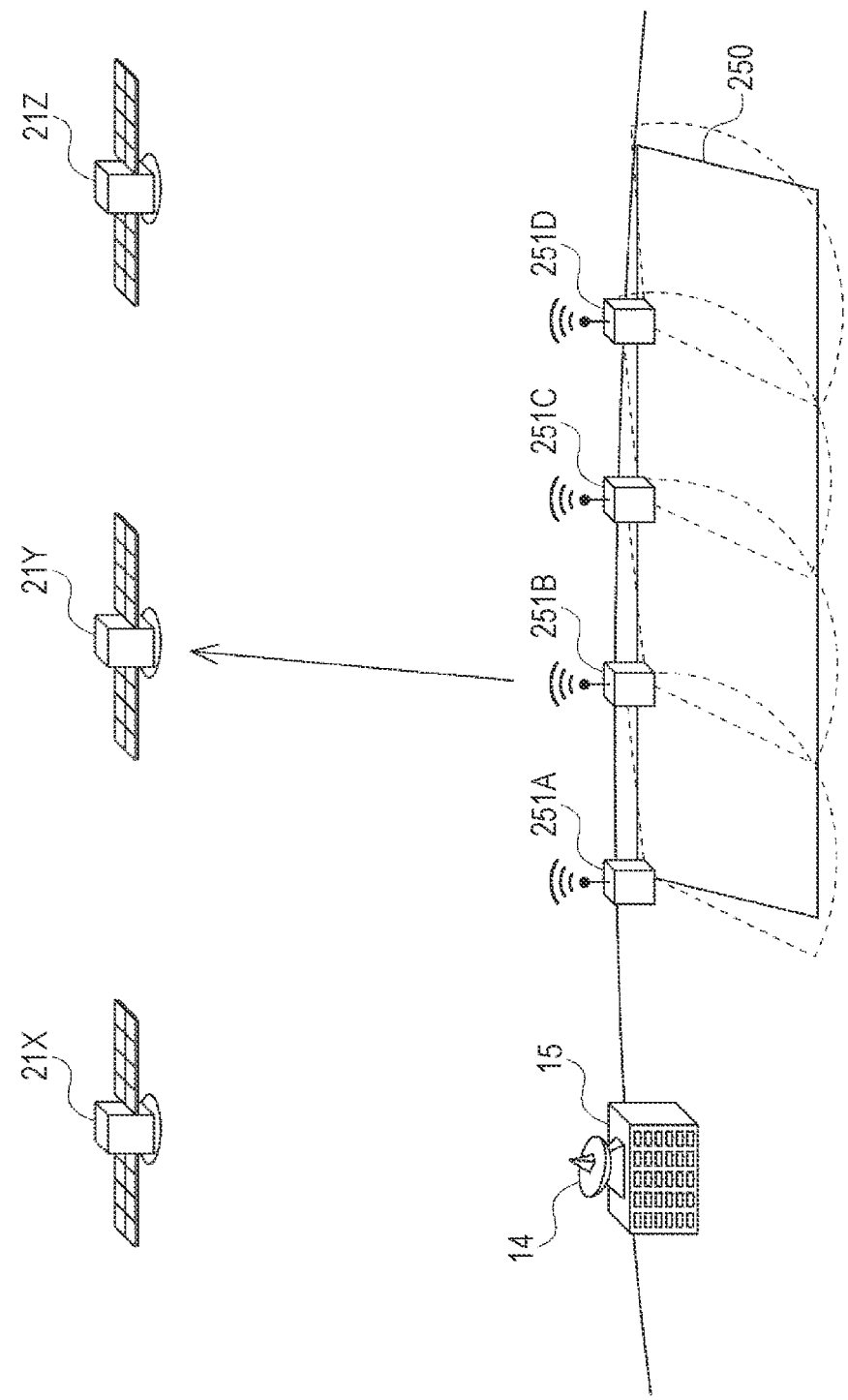

ARTIFICIAL SATELLITE AND CONTROL METHOD THEREOF

CROSS REFERENCE TO RELATED APPLICATIONS

This application is a U.S. National Phase of International Patent Application No. PCT/JP2020/021287 filed on May 29, 2020, which claims priority benefit of Japanese Patent Application No. JP 2019-109285 filed in the Japan Patent Office on Jun. 12, 2019. Each of the above-referenced applications is hereby incorporated herein by reference in its entirety.

TECHNICAL FIELD

The present technology relates to an artificial satellite and a control method thereof, and particularly relates to an artificial satellite and a control method thereof that enable to ensure quality of a captured image while suppressing battery consumption.

BACKGROUND ART

There is a technology called satellite remote sensing for observing a situation of a target region or a target object and detecting a situation change from an image of a predetermined region on the earth captured by an artificial satellite (see, for example, Patent Documents 1 and 2).

CITATION LIST

Patent Document

Patent Document 1: International Publication No. 2010/097921
Patent Document 2: Japanese Patent Application Laid-Open No. 2004-15451

SUMMARY OF THE INVENTION

Problems to be Solved by the Invention

Since the artificial satellite is driven by a battery by solar power generation, imaging may be limited by a remaining battery amount in some cases.

The present technology has been made in view of such a situation, and an object is to be able to ensure quality of a captured image while suppressing battery consumption.

Solutions to Problems

An artificial satellite according to one aspect of the present technology includes: an imaging device configured to perform imaging of a predetermined region on the ground; and a management unit configured to change accuracy of attitude control in accordance with a remaining battery amount at an instructed imaging time, and configured to change an imaging condition in accordance with accuracy of the attitude control.

A control method for an artificial satellite according to one aspect of the present technology includes: changing, by an artificial satellite including an imaging device configured to perform imaging of a predetermined region on the ground, accuracy of attitude control in accordance with a remaining battery amount at an instructed imaging time, and changing an imaging condition in accordance with accuracy of the attitude control.

In one aspect of the present technology, accuracy of attitude control is changed in accordance with a remaining battery amount at an instructed imaging time, and an imaging condition is changed in accordance with accuracy of the attitude control.

BRIEF DESCRIPTION OF DRAWINGS

FIG. 2 is a diagram for explaining formation flight.
FIGS. 3A and 3B are diagrams for explaining formation flight.
FIG. 10 is a view for explaining information given as metadata.
FIG. 11 is a view illustrating a configuration example of a second embodiment of a satellite image processing system to which the present technology is applied.

MODE FOR CARRYING OUT THE INVENTION

Figure 1:
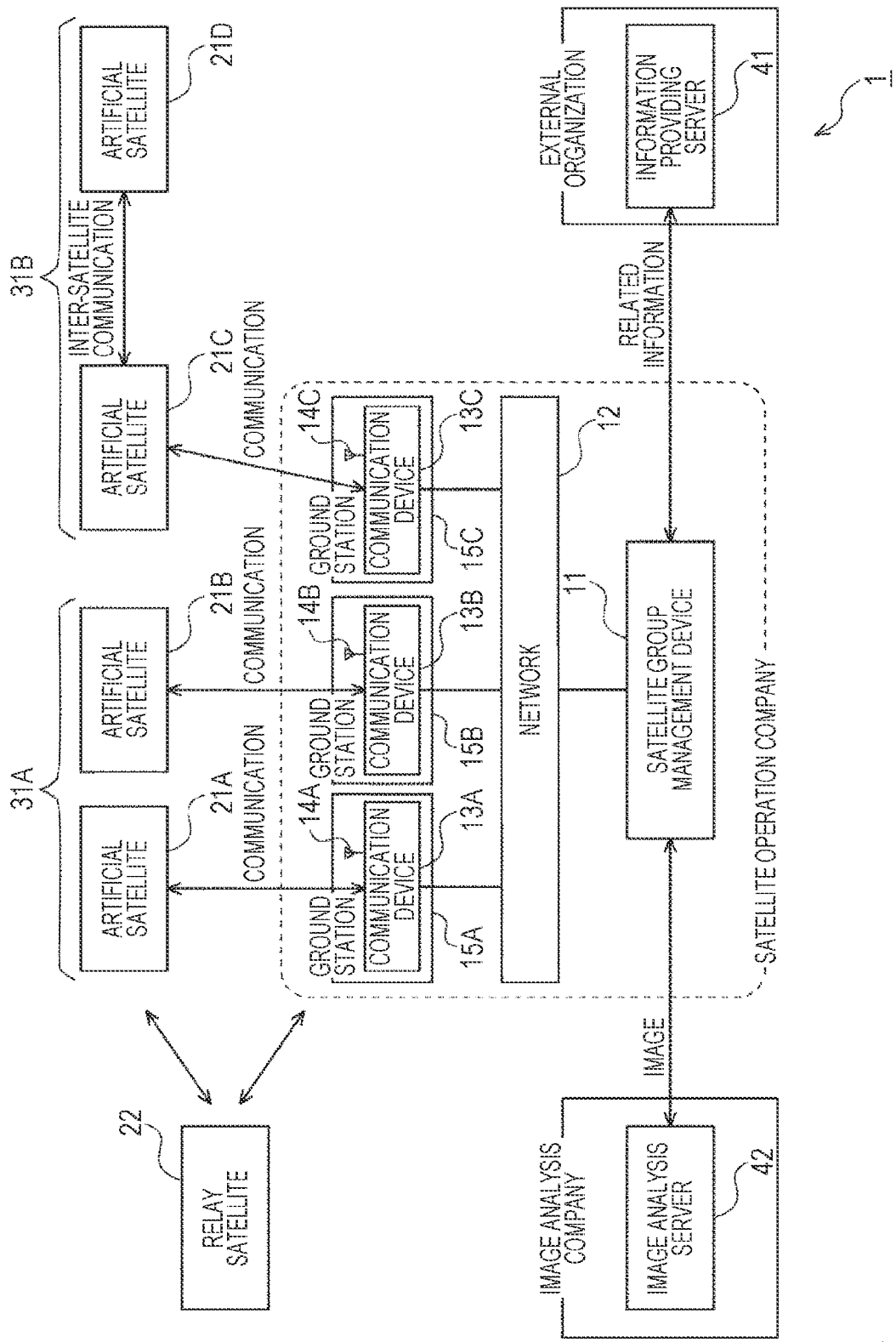
FIG. 1 is a block diagram illustrating a configuration example of a first embodiment of a satellite image processing system to which the present technology is applied.

Hereinafter, embodiments for implementing the present technology (hereinafter, referred to as embodiments) will be described. Note that the description will be given in the following order.

1. Configuration example of satellite image processing system
2. Imaging sequence of single device
3. Imaging preparation processing
4. Flowchart of formation flight
5. Example of image processing
6. Details of metadata
7. Details of distribution management processing 8. Application example of formation flight
9. Second embodiment of satellite image processing system
10. First event imaging sequence of second embodiment
11. Second event imaging sequence of second embodiment
12. Third event imaging sequence of second embodiment
13. Another configuration example of transmission device
14. Application example of satellite image processing system using event detection sensor
15. Computer configuration example <1. Configuration Example of Satellite Image Processing System>

FIG. 1 is a block diagram illustrating a configuration example of a first embodiment of a satellite image processing system to which the present technology is applied.

A satellite image processing system 1 of FIG. 1 is a system that observes a situation of a target region or a target object on the earth by using a captured image captured by a plurality of artificial satellites (hereinafter, simply referred to as satellites), and performs satellite remote sensing for detecting a situation change. In the present embodiment, the satellite is mounted with an imaging device and has at least a function of imaging on the ground.

A satellite operation company includes a satellite group management device 11 that manages a plurality of satellites 21 and a plurality of communication devices 13 that communicates with the satellites 21. Note that the satellite group management device 11 and some of the plurality of communication devices 13 may be devices owned by other than the satellite operation company. The satellite group management device 11 and the plurality of communication devices 13 are connected via a predetermined network 12. The communication devices 13 are arranged at a ground station (base station on the ground) 15. Note that FIG. 1 illustrates an example in which the number of communication devices 13 is three of communication devices 13A to 13C, but any number of communication devices 13 may be adopted.

The satellite group management device 11 manages the plurality of satellites 21 owned by the satellite operation company. Specifically, the satellite group management device 11 acquires related information from one or more information providing servers 41 of an external organization as necessary, and determines an operation plan for the plurality of satellites 21 owned by the self. Then, the satellite group management device 11 gives an imaging instruction to the predetermined satellite 21 via the communication device 13 in response to a request of a customer, to cause the predetermined satellite 21 to perform imaging. Furthermore, the satellite group management device 11 acquires and stores a captured image transmitted from the satellite 21 via the communication device 13. The acquired captured image is subjected to predetermined image processing as necessary, and provided (transmitted) to the customer. Alternatively, the acquired captured image is provided (transmitted) to an image analysis server 42 of an image analysis company, subjected to predetermined image processing, and then provided to the customer.

The information providing server 41 installed in an external organization supplies predetermined related information to the satellite group management device 11, in response to a requirement from the satellite group management device 11 or periodically via a predetermined network. The related information provided from the information providing server 41 includes, for example, the following. For example, orbit information of a satellite described in a two-line elements (TLE) format can be acquired as related information from North American Air and Space Defense Command (NORAD) as an external organization. Furthermore, for example, it is possible to acquire weather information such as weather and cloud cover at a predetermined point on the earth, from a weather information providing company as an external organization.

The image analysis server 42 performs predetermined image processing on a captured image obtained by the satellite 21, supplied from the satellite group management device 11 via a predetermined network. The processed image is provided to a customer of the image analysis company or supplied to the satellite group management device 11 of the satellite operation company.

For example, the image analysis server 42 performs metadata generation processing of adding predetermined metadata to an image captured by the satellite 21, correction processing such as distortion correction of the captured image, image synthesis processing such as color synthesis processing, and the like. The image processing on the captured image may be performed by the satellite operation company, and in this case, the satellite operation company and the image analysis company are the same. Furthermore, the satellite group management device 11 and the image analysis server 42 may be implemented by one device.

The communication device 13 communicates with a predetermined satellite 21 designated by the satellite group management device 11 via an antenna 14, under the control of the satellite group management device 11. For example, the communication device 13 transmits an imaging instruction for performing imaging of a predetermined region on the ground at a predetermined time and position, to the predetermined satellite 21. Furthermore, the communication device 13 receives the captured image transmitted from the satellite 21, and supplies to the satellite group management device 11 via the network 12. Transmission from the communication device 13 of the ground station 15 to the satellite 21 is also referred to as uplink, and transmission from the satellite 21 to the communication device 13 is also referred to as downlink. The communication device 13 can perform direct communication with the satellite 21, and can also perform communication via a relay satellite 22. As the relay satellite 22, for example, a geostationary satellite is used.

The network 12 and a network between the information providing server 41 or the image analysis server 42 and the satellite group management device 11 are any communication network, and may be a wired communication network or a wireless communication network, or may be configured with both of them. Furthermore, the network 12 and the network between the information providing server 41 or the image analysis server 42 and the satellite group management device 11 may be configured by one communication network or may be configured by a plurality of communication networks. These networks may be a communication network or a communication path of any communication standard such as, for example, the Internet, a public telephone network, a wide-area communication network for a wireless mobile body such as a so-called 4G line or 5G line, a wide area network (WAN), a local area network (LAN), a wireless communication network that performs communication conforming to the Bluetooth (registered trademark) standard, a communication path for short-range wireless communication such as near field communication (NFC), a communication path for infrared communication, and a communication network of wired communication conforming to a standard such as high-definition multimedia interface (HDMI (registered trademark)) or universal serial bus (USB).

A plurality of the individual satellites 21 constitutes a satellite group 31. In FIG. 1, a satellite 21A and a satellite 21B are included in a first satellite group 31A, and a satellite 21C and a satellite 21D are included in a second satellite group 31B. Note that, in the example of FIG. 1, for the sake of simplicity, an example is illustrated in which one satellite group 31 includes two satellites 21, but the number of satellites 21 included in one satellite group 31 is not limited to two.

In a case where the communication device 13 communicates with each of the satellites 21 included in the satellite group 31, there are a method of individually communicating with each satellite 21 as in the first satellite group 31A of FIG. 1, and a method in which, as in the second satellite group 31B, only one satellite 21C (hereinafter, also referred to as a representative satellite 21C) representing the satellite group 31 communicates with the communication device 13 while another satellite 21D indirectly communicates with the communication device 13 through inter-satellite communication with the representative satellite 21C. Which method is to be used for communicating with (the communication device 13 of) the ground station 15 may be determined in advance by the satellite group 31, or may be appropriately selected in accordance with contents of communication.

In the satellite image processing system 1 configured as described above, the plurality of satellites 21 included in one satellite group 31 may be operated by an operation method called formation flight.

As illustrated in FIG. 2, the formation flight is an operation method in which the plurality of satellites 21 included in one satellite group 31 flies while maintaining a relative positional relationship in a narrow range of about several hundred meters to several kilometers, and the plurality of satellites 21 operates in cooperation, which can provide a service that cannot be achieved by a single satellite. In FIG. 2, three satellites 21X to 21Z are included in one satellite group 31, and each of the satellites 21X to 21Z communicates with the ground station 15. On the uplink, by designating a group ID (satellite group ID) that is an identifier for identifying the satellite group 31 and an individual ID (satellite ID) that is an identifier for identifying each of the satellites 21 included in the satellite group 31, a command or data is transmitted to the desired satellite 21.

In the formation flight, since functions can be shared by the plurality of satellites 21 instead of a single satellite, there is an advantage that each satellite 21 can be downsized. For example, in the imaging function, even if a performance (for example, a resolution) of the imaging device mounted on each satellite 21 is lowered, a high resolution can be achieved by image synthesis or the like on captured images captured by the plurality of satellites 21.

For example, as illustrated in FIG. 3A, two satellites 21E and 21F can simultaneously image (simultaneously perform imaging of) one region 52 from different imaging points (satellite positions). Imaging results of the same ground surface from different imaging points can be used to generate a numerical altitude model (digital elevation model, DEM) indicating a height necessary for three-dimensional measurement. Furthermore, a parallax image is obtained from captured images of the two satellites 21E and 21F, and three-dimensional measurement can be performed.

Furthermore, as illustrated in FIG. 3B, the plurality of satellites 21E and 21F can perform imaging (differential imaging) on one region 52 with a time difference at the same imaging point and imaging angle. For example, in a case where the satellite 21 moves at a speed of 7 km per second and a distance between the satellites 21 in convoy flight is 100 m, imaging can be performed every $1.4 \times 10^{-2}$ seconds. As described above, in the formation flight, imaging can be performed at short time intervals. Therefore, for example, it is possible to extract a change (displacement) of an object on the earth such as a passenger car on a road or a buoy on the sea, and measure a speed of a moving object.

For operating the plurality of satellites 21, there is a constellation as a system. However, the constellation is a "a system that develops services mainly uniformly over the entire sphere by putting a large number of satellites into a single or a plurality of orbital planes", and is a concept different from the formation flight.

Figure 4:
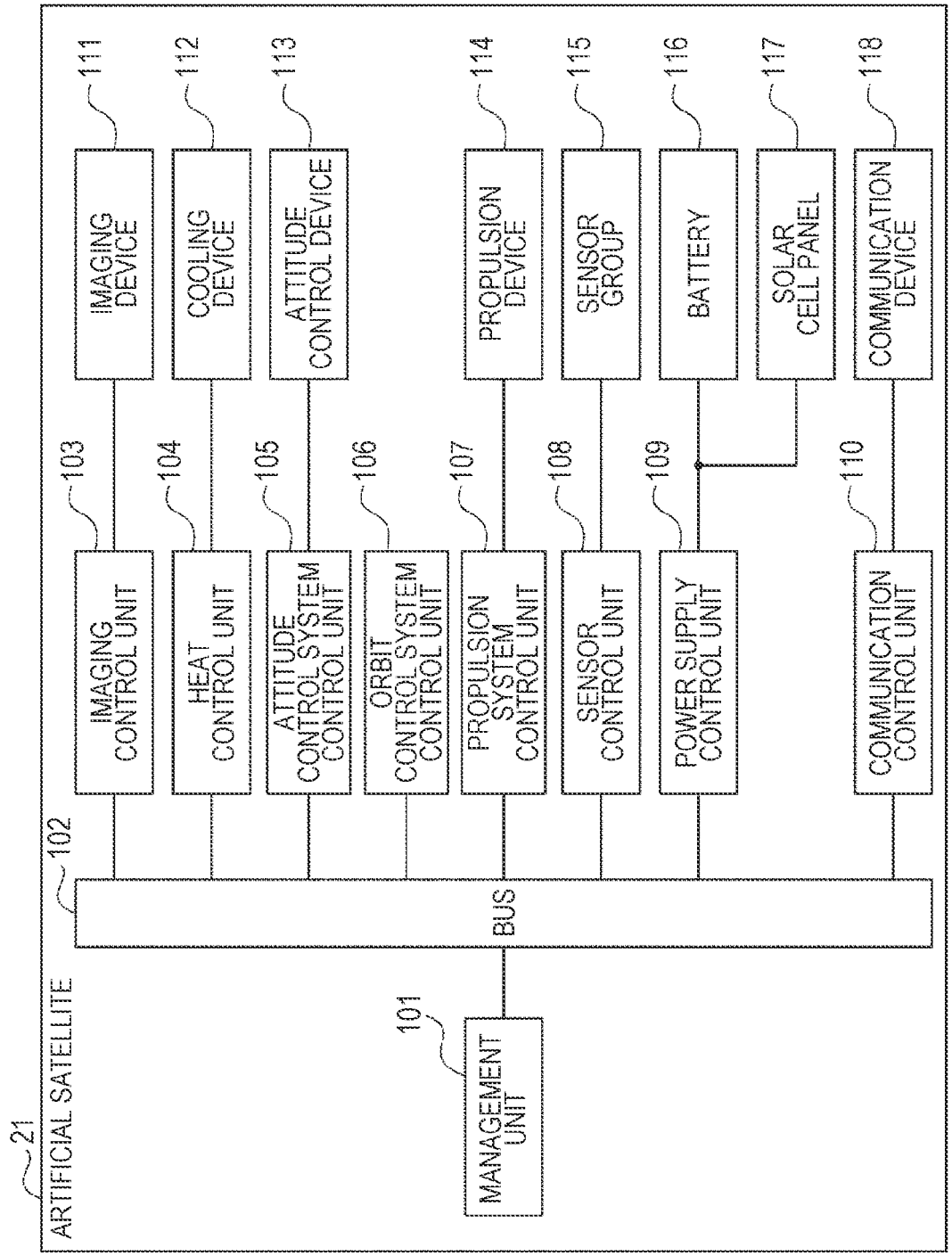
FIG. 4 is a block diagram illustrating a configuration example of a satellite.

FIG. 4 is a block diagram illustrating a configuration example of the satellite 21.

The satellite 21 includes a management unit 101, a bus 102, an imaging control unit 103, a heat control unit 104, an attitude control system control unit 105, an orbit control system control unit 106, a propulsion system control unit 107, a sensor control unit 108, a power supply control unit 109, and a communication control unit 110. Furthermore, the satellite 21 also includes an imaging device 111, a cooling device 112, an attitude control device 113, a propulsion device 114, a sensor group 115, a battery 116, a solar cell panel 117, and a communication device 118. The management unit 101, and the imaging control unit 103, the heat control unit 104, the attitude control system control unit 105, the orbit control system control unit 106, the propulsion system control unit 107, the sensor control unit 108, the power supply control unit 109, and the communication control unit 110, which are control units of the respective devices, are connected via the bus 102.

The management unit 101 acquires a state of each device from the control unit of each device via the bus 102 and outputs an operation command to the control unit of each device, to control an operation of the entire satellite 21.

The imaging control unit 103 controls an operation of the imaging device 111 in response to an operation command from the management unit 101. The imaging device 111 includes, for example, a camera module including an image sensor, and performs imaging of a target object. In a case where the satellite 21 is a synthetic aperture radar (SAR) satellite, the imaging device 111 includes a radar device.

The heat control unit 104 acquires sensor values of temperature sensors included in the sensor group 115, monitors a temperature change in the satellite 21, and controls the entire satellite 21 to have a temperature within a prescribed temperature range. Basically, the temperature change is controlled by characteristics of a structure and a material, but dynamic cooling using the cooling device 112 may be performed as necessary in some cases. The cooling device 112 performs cooling using a cryogen such as liquid helium, for example.

The attitude control system control unit 105 controls the attitude control device 113 in response to an operation command from the management unit 101, to perform control to direct the satellite 21 toward a target direction. For example, the attitude control system control unit 105 performs control to direct the antenna 14 toward the ground station 15, direct the solar cell panel 117 toward a direction of the sun, and direct an observation sensor such as the imaging device 111 toward an observation target direction. The attitude control device 113 includes, for example, a wheel such as a three-axis gyro or a control moment gyro, a magnetic torquer, and the like. The attitude control system control unit 105 may use not only the attitude control device 113 but also the propulsion device 114 for attitude control application, in some cases. When performing attitude control, the attitude control system control unit 105 acquires sensor values of various sensors of the sensor group 115 as necessary. Examples of the sensor used for the attitude control application include, for example, a sun sensor, an earth sensor, a star sensor, a magnetic sensor, a gyro, and the like.

The orbit control system control unit 106 performs control related to maintenance of an orbital altitude and to a change of the orbit. The orbit control system control unit 106 performs control in cooperation with the propulsion system control unit 107 and the propulsion device 114.

The propulsion system control unit 107 controls the propulsion device 114 in response to an operation command from the management unit 101. The propulsion device 114 includes, for example, a solid motor, an ion engine, an apogee engine, and the like. The propulsion system control unit 107 acquires sensor values of various sensors of the sensor group 115, and operates the propulsion device 114 in cooperation with the attitude control device 113 as necessary, to perform attitude control and attitude control of the satellite 21. In a case where the satellite 21 is a small satellite, a chemical propulsion thruster or the like may not be mounted for attitude control purposes.

The sensor control unit 108 controls various sensors included in the sensor group 115, and supplies sensor values to the management unit 101 or to another control unit. The various sensors are sensors to monitor a state in the satellite 21, and include, for example, a GPS receiver, a star tracker (attitude sensor), an acceleration sensor, a gyro sensor, a magnetic sensor, a temperature sensor, a sun sensor, an earth sensor, a star sensor, and the like.

The power supply control unit 109 controls the battery 116 and the solar cell panel 117. Power generated by the solar cell panel 117 is stored in the battery 116 under the control of the power supply control unit 109. Power of the battery 116 may be directly distributed to each device in the satellite 21 or may be distributed via the bus 102.

The communication control unit 110 controls the communication device 118 in response to an operation command from the management unit 101. The communication device 118 includes an antenna, and communicates with the communication device 13 of the ground station 15 under the control of the communication control unit 110. Furthermore, the communication device 118 can also communicate with other satellites 21 included the same satellite group 31 and the relay satellite 22. Furthermore, in some cases, the communication control unit 110 and the communication device 118 may have a configuration in which systems are divided for transmission and reception of commands and telemetry, which involves small data amounts, and transmission and reception of mission system data (imaging data and the like), which involves large data amounts.

The individual control units of the imaging control unit 103 to the communication control unit 110 may be further divided into two or more or may be integrated with the management unit 101, or any two or more may be integrated. Calculation resources such as a central processing unit (CPU) and a memory are basically mounted on the management unit 101, but may also be mounted on each control unit. Each control unit may be implemented in a common hardware module.

The imaging devices 111 of the respective satellites 21 may have the same performance or different performances between the plurality of satellites 21 included in one satellite group 31.

For example, in a case where the imaging devices 111 of the same model number are adopted as the imaging devices 111 mounted on the respective satellites 21 and the satellites 21 have the same performance, there are the following advantages. For example, images having the same performance can be acquired with a short time difference, and a difference can be easily detected.

Furthermore, it is possible to generate a highly accurate (high-resolution) image by synthesizing images captured in a shared manner. Furthermore, since redundancy can be provided, even if a malfunction occurs in one device, it is allowable.

Whereas, in a case where the imaging devices 111 mounted on the respective satellites 21 have different performances, for example, it is possible to cause imaging of different roles to be performed, such as sharing between high-sensitivity monochrome imaging and low-sensitivity color imaging. Note that a case of the different performances includes not only a case where the mounted hardware configuration is different but also a case where the mounted hardware configuration is the same but the performance is made different by performing different control. For example, for image sensors of the same model number, an example is assumed in which one satellite 21 acquires a low-resolution image with high sensitivity by increasing a shutter speed, and another satellite 21 acquires a high-resolution image with low sensitivity on the contrary.

As a sharing example in a case where the performance is made different among the imaging devices 111 of the plurality of satellites 21, for example, there may be control to individually make a difference in any one of sensitivity/shutter speed, a resolution, monochrome/color/polarization, and a band (wavelength range), or a combination thereof. Furthermore, the plurality of satellites 21 may have different battery performances and communication performances.

Figure 5:
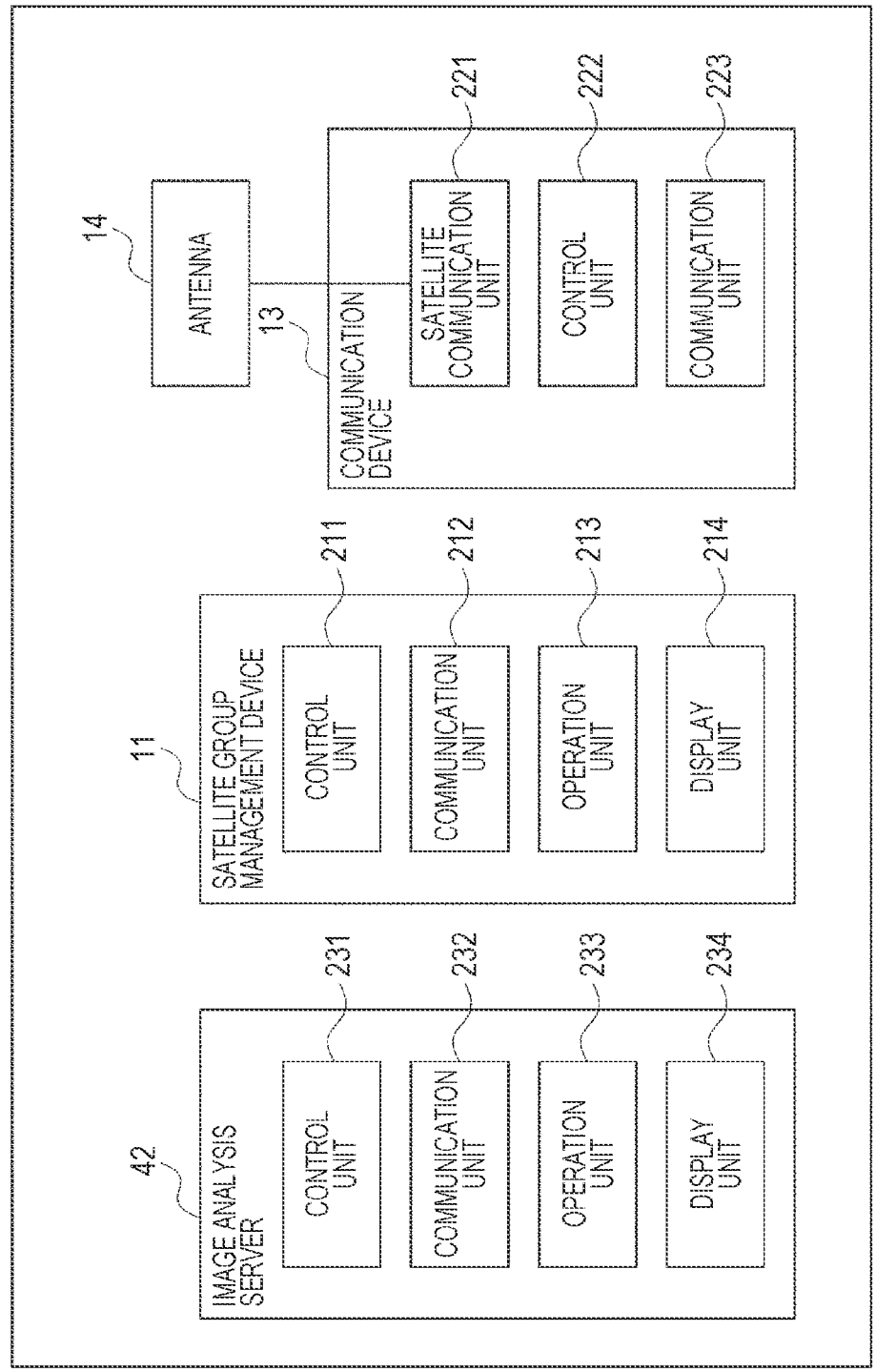
FIG. 5 is a block diagram illustrating a configuration example of a satellite group management device, a communication device, and an image analysis server.

FIG. 5 is a block diagram illustrating a configuration example of the satellite group management device 11, the communication device 13, and the image analysis server 42.

The satellite group management device 11 includes a control unit 211, a communication unit 212, an operation unit 213, and a display unit 214.

The control unit 211 manages the plurality of satellites 21 owned by the satellite operation company, by executing a satellite management application program stored in a storage unit (not illustrated). For example, the control unit 211 determines an operation plan of the plurality of satellites 21 by using related information acquired from the information providing server 41 as necessary, and instructs each satellite 21 to control an attitude and perform imaging, via the communication device 13. Furthermore, the control unit 211 performs processing of generating metadata of a captured image transmitted from the satellite 21 via the communication device 13 and adding to the captured image.

In accordance with an instruction from the control unit 211, the communication unit 212 performs predetermined communication with the communication device 13 via the network 12, and also performs predetermined communication with the image analysis server 42.

The operation unit 213 includes, for example, a keyboard, a mouse, a touch panel, or the like, receives a command or data input based on a user (operator) operation, and supplies to the control unit 211.

The display unit 214 includes, for example, a liquid crystal display (LCD) or an organic electro luminescence (EL) display, and displays a screen of a satellite management application program, or displays a captured image captured by the satellite 21, a processed image obtained by performing predetermined image processing on the captured image, and the like.

The communication device 13 includes a satellite communication unit 221, a control unit 222, and a communication unit 223.

The satellite communication unit 221 communicates with each satellite 21 of the target satellite group 31 via the antenna 14 on the basis of the control of the control unit 222.

The control unit 222 causes the satellite communication unit 221 to communicate with the satellite 21 under the control from the satellite group management device 11. Furthermore, the control unit 222 transmits data such as a captured image acquired from the satellite 21, to the satellite group management device 11 via the communication unit 223.

The communication unit 223 performs predetermined communication with the satellite group management device 11 on the basis of the control of the control unit 222.

The image analysis server 42 includes a control unit 231, a communication unit 232, an operation unit 233, and a display unit 234.

The control unit 231 executes an image analysis application program stored in a storage unit (not illustrated) to execute predetermined image processing on the captured image supplied from the satellite group management device 11, such as, for example, metadata generation processing of adding predetermined metadata to the captured image, correction processing such as distortion correction of the captured image, and image synthesis processing such as color synthesis processing.

The communication unit 232 performs predetermined communication with the satellite group management device 11 or another device under the control from the control unit 231. For example, the communication unit 232 receives a captured image captured by the satellite 21 from the satellite group management device 11, supplies the captured image to the control unit 231, and transmits a processed image after image processing to the satellite group management device 11.

The operation unit 233 includes, for example, a keyboard, a mouse, a touch panel, or the like, receives a command or data input based on a user (operator) operation, and supplies to the control unit 231.

The display unit 214 includes, for example, an LCD or an organic EL display, and displays a screen of an image analysis application program or displays an image before image processing or after image processing, and the like.

The satellite 21 and other devices included in the satellite image processing system 1 are configured as described above.

Note that the satellite group management device 11 selects an optimum communication device 13 from among the plurality of communication devices 13 in accordance with an orbit of the satellite 21 that performs communication, and causes the selected communication device 13 to transmit a predetermined command such as an imaging instruction or receives data such as a captured image via the communication device 13. The satellite group management device 11 performs predetermined communication integrally with the communication device 13 that is freely selected in accordance with the target satellite 21. Therefore, in the following description, the satellite group management device 11 and the communication device 13 will be collectively referred to as a management system.

<2. Imaging Sequence of Single Device>

Next, an imaging sequence focusing on one predetermined satellite 21 of the satellite group 31 that performs formation flight will be described with reference to a flowchart of FIG. 6.

First, in step S11, the management system determines imaging requirements by the satellite 21 on the basis of a request of a customer.

Specifically, the management system determines, as the imaging requirements, an imaging date and time, an imaging point, environmental conditions for imaging, camera setting values, and the like. The environmental conditions for imaging include, for example, weather conditions such as cloud cover at the imaging date and time, and the camera setting values include, for example, a resolution (resolving power), zoom, a shutter speed, sensitivity, an aperture, and the like.

In step S12, the management system determines (the communication device 13 of) the satellite 21 that meets the imaging requirements, and the ground station 15.

Specifically, the management system selects the satellite 21 that meets the determined imaging requirements. For example, the satellite 21 is determined by determining whether the satellite 21 passes in the sky above an imaging target position at the determined imaging date and time, whether the imaging target position is within a range of an observation width of the satellite 21, whether the imaging device 111 mounted on the satellite 21 satisfies the determined requirement for the resolving power and the camera setting values, and the like. Then, the ground station 15 suitable for communicating with the selected satellite 21 is determined.

Furthermore, the management system can select the satellite 21 in consideration of an expected remaining amount of a battery of the satellite 21 at the imaging date and time, power consumption of imaging, and the like. For example, in a case where the selected satellite 21 is planned to perform another imaging immediately before the imaging date and time, it is also assumed that power is consumed by the imaging, and by attitude control, data communication, heat control, and the like accompanying the imaging, and the next imaging cannot be performed. Therefore, the satellite 21 is selected by setting the priority of the satellite 21 in accordance with the expected remaining amount of the battery and the power consumption of imaging.

In step S13, the management system directs the antenna 14 of the selected ground station 15 to an expected orbit. The satellite group management device 11 transmits orbit information of the selected satellite 21 to the communication device 13, and the communication device 13 directs the antenna 14 to the expected orbit.

In step S14, the management system transmits (uplinks) an imaging instruction to the selected satellite 21. That is, the satellite group management device 11 transmits a command for transmitting an imaging instruction to the communication device 13 of the selected ground station 15, and the communication device 13 having received the command transmits the imaging instruction to the selected satellite 21 via the antenna 14. The imaging instruction includes an imaging date and time, an imaging point, camera setting values, and the like.

The satellite 21 receives the imaging instruction from the ground station 15 in step S31, and transmits reception completion to the ground station 15 in step S32.

In step S15, the management system receives the reception completion from the satellite 21, and stops transmitting the imaging instruction. The transmission of the imaging instruction from the ground station 15 is repeatedly executed until there is a response of the reception completion from the satellite 21.

In step S33, the satellite 21 performs imaging preparation processing based on the received imaging instruction. For example, the satellite 21 controls an attitude of the satellite 21 or an orientation of the imaging device 111 (pointing) such that the imaging device 111 faces the imaging target position, as necessary. Furthermore, for example, the imaging control unit 103 sets zoom, a shutter speed, sensitivity, an aperture, and the like of the image sensor. Moreover, the power supply control unit 109 performs charging in advance so as to obtain sufficient power for the imaging date and time.

When the imaging date and time designated by the imaging instruction comes, the satellite 21 performs imaging of the imaging target position in step S34.

In step S35, the satellite 21 generates metadata that is information to be associated with the captured image obtained as a result of the imaging, and adds to the captured image. Although details of the metadata will be described later, for example, information such as a group ID for identifying the satellite group 31, an individual ID for identifying each satellite 21, an imaging target position (subject position), and an imaging time can be generated as the metadata.

In step S36, the satellite 21 transmits (downlinks) the captured image added with the metadata, to the ground station 15. The downlink may be performed immediately after generation of the captured image and the metadata, or may be performed when the satellite 21 reaches within a predetermined range of the predetermined ground station 15. Furthermore, the captured image may be transmitted via the relay satellite 22.

In step S16, the management system receives the captured image from the satellite 21. Specifically, the communication device 13 receives the captured image via the antenna 14, and supplies to the satellite group management device 11.

In step S17, the satellite group management device 11 analyzes the metadata of the captured image. At this time, the satellite group management device 11 may newly generate metadata on the basis of the analysis result, and add the metadata. For example, the satellite group management device 11 calculates a satellite position at the time of imaging on the basis of the group ID and the individual ID of the captured image and on the basis of orbit information of the satellite 21, and adds the satellite position as metadata.

In step S18, the satellite group management device 11 performs predetermined image processing on the captured image captured by the satellite 21. The satellite group management device 11 performs, for example, correction processing such as distortion correction, image synthesis processing such as color synthesis processing, and the like. Details of the image processing will be described later.

In step S19, the satellite group management device 11 executes distribution management processing on the captured image and the processed image, and causes a predetermined storage unit to store. Details of the distribution management processing will also be described later.

Thus, a series of sequence in which one satellite 21 performs imaging is ended. Note that the image processing by the image analysis server 42 can be appropriately performed as necessary, and can be performed in a shared manner with the image processing of the satellite group management device 11 or instead of being performed by the satellite group management device 11. The distribution management processing may also be performed by the image analysis server 42.

Note that, in the example described above, the metadata is added to the captured image to be transmitted, but the metadata may be transmitted as a stream different from the captured image. At this time, only the metadata may be transmitted prior to the captured image.

<3. Imaging Preparation Processing>

Meanwhile, resources are limited particularly in a small satellite 21. Therefore, it is necessary to particularly pay attention to a remaining battery amount, and imaging control corresponding thereto is important.

Figure 6:
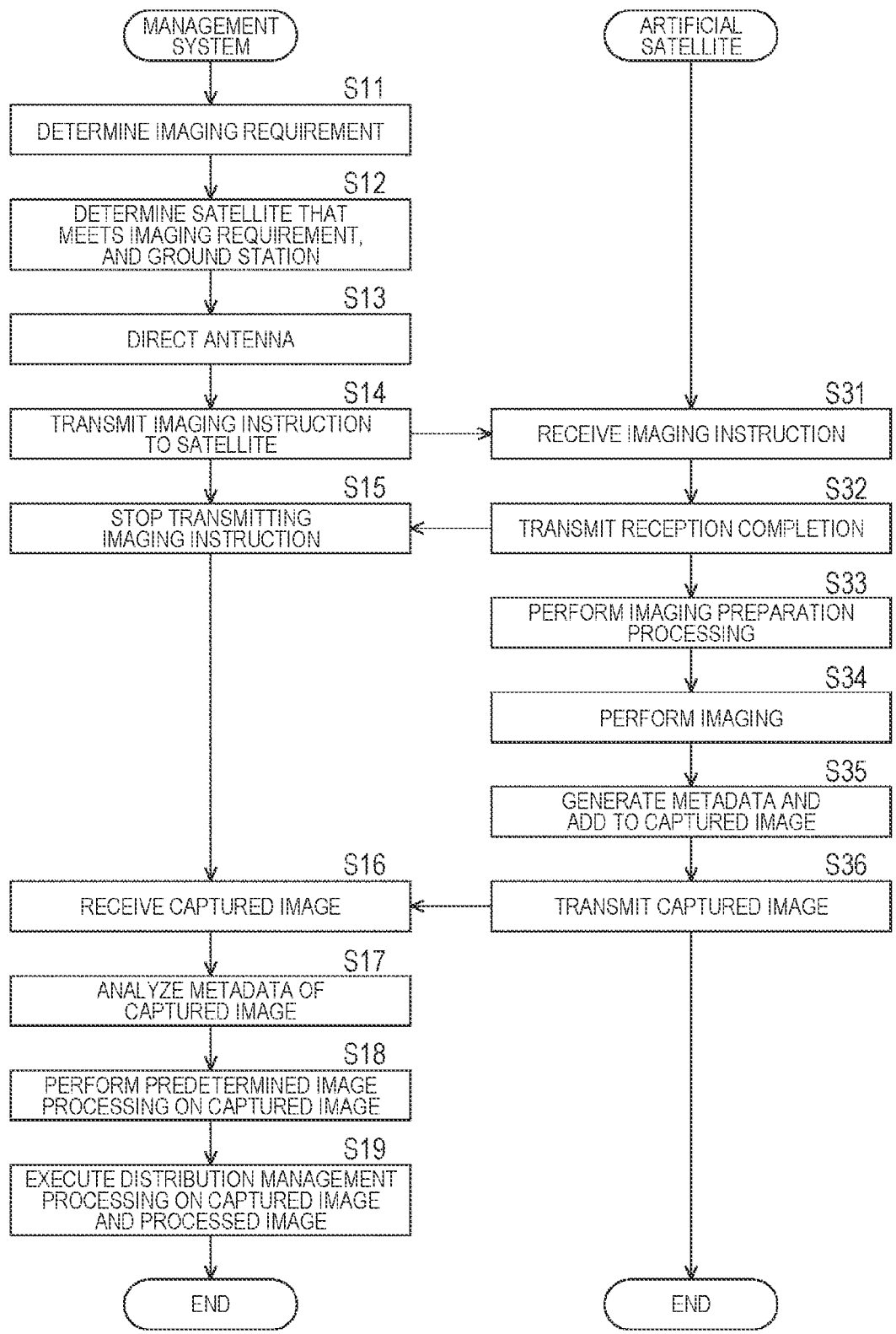
FIG. 6 is a flowchart illustrating an imaging sequence focusing on one satellite.
Figure 7:
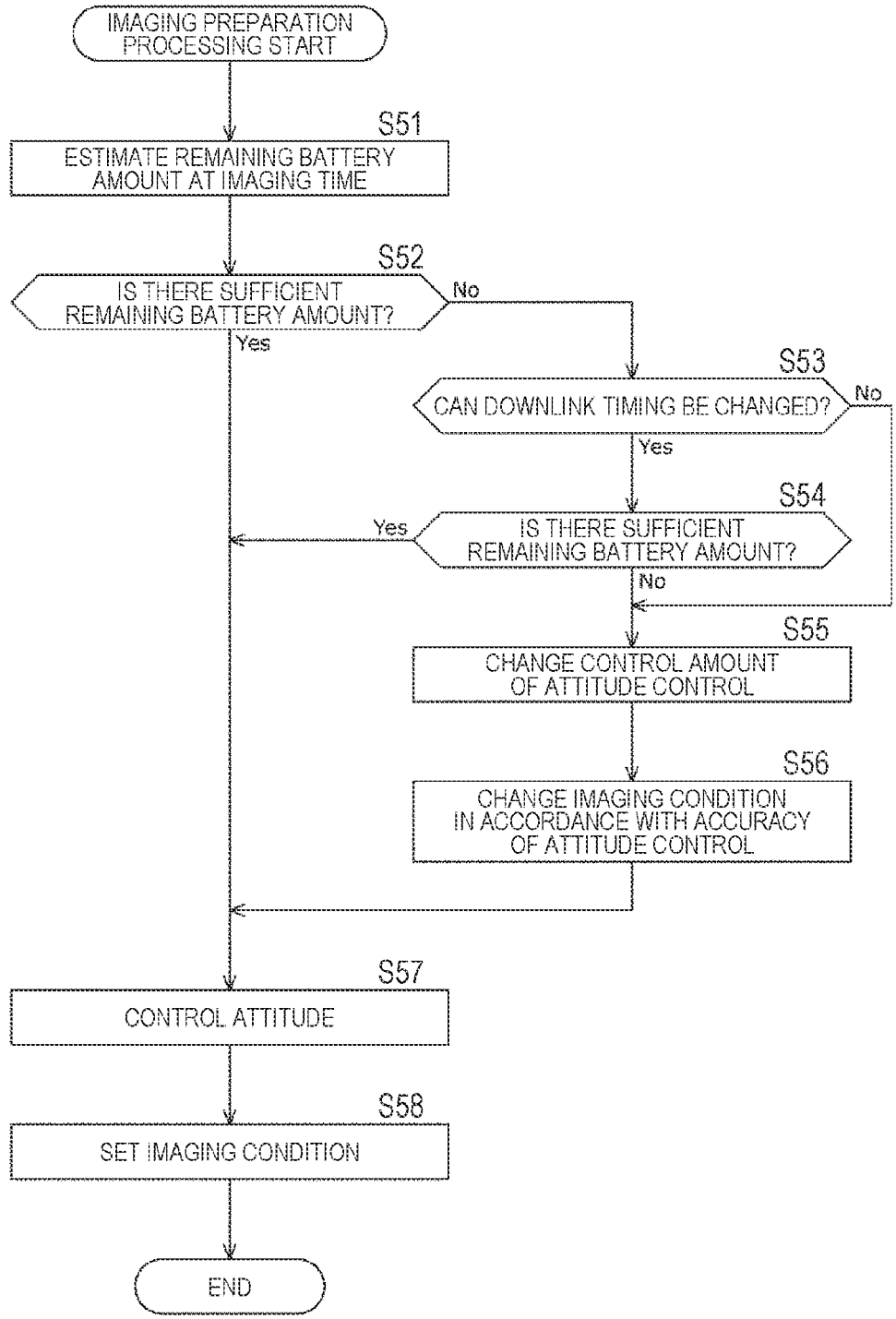
FIG. 7 is a detailed flowchart of imaging preparation processing in step S33 in FIG. 6.

FIG. 7 is a detailed flowchart of the imaging preparation processing in step S33 of FIG. 6. Here, it is assumed that the imaging instruction received in step S31 before step S33 has instructed imaging at an imaging time t1.

In the imaging preparation processing, first, in step S51, the management unit 101 of the satellite 21 estimates a remaining battery amount at the imaging time t1. Specifically, the management unit 101 estimates the remaining battery amount at the imaging time t1 from (an estimated value of) a charge amount to be accumulated by solar power generation by the imaging time t1 with respect to a current remaining battery amount.

In step S52, the management unit 101 determines whether there is a sufficient remaining battery amount on the basis of the estimated remaining battery amount.

Specifically, the management unit 101 determines whether the estimated remaining battery amount is a sufficient remaining battery amount, from a power consumption element related to imaging and a power consumption element for other than imaging. The power consumption element related to imaging includes imaging processing of the imaging device 111, attitude control (pointing) of the satellite 21, heat control associated therewith, and the like. In the imaging processing of the imaging device 111, consideration is given to how many images are captured at the imaging time t1 and with what degree of accuracy (resolving power, a shutter speed, necessity of zooming, and the like). The attitude control of the satellite 21 includes a change in an attitude of the satellite itself and a change in an attitude of the antenna. Furthermore, in a case where a camera module itself as the imaging device 111 can change an attitude toward an imaging direction, the attitude change of the camera module is also included in the attitude control of the satellite 21. The power consumption elements other than imaging include communication (uplink and downlink) performed by the imaging time t1.

Figure 8:
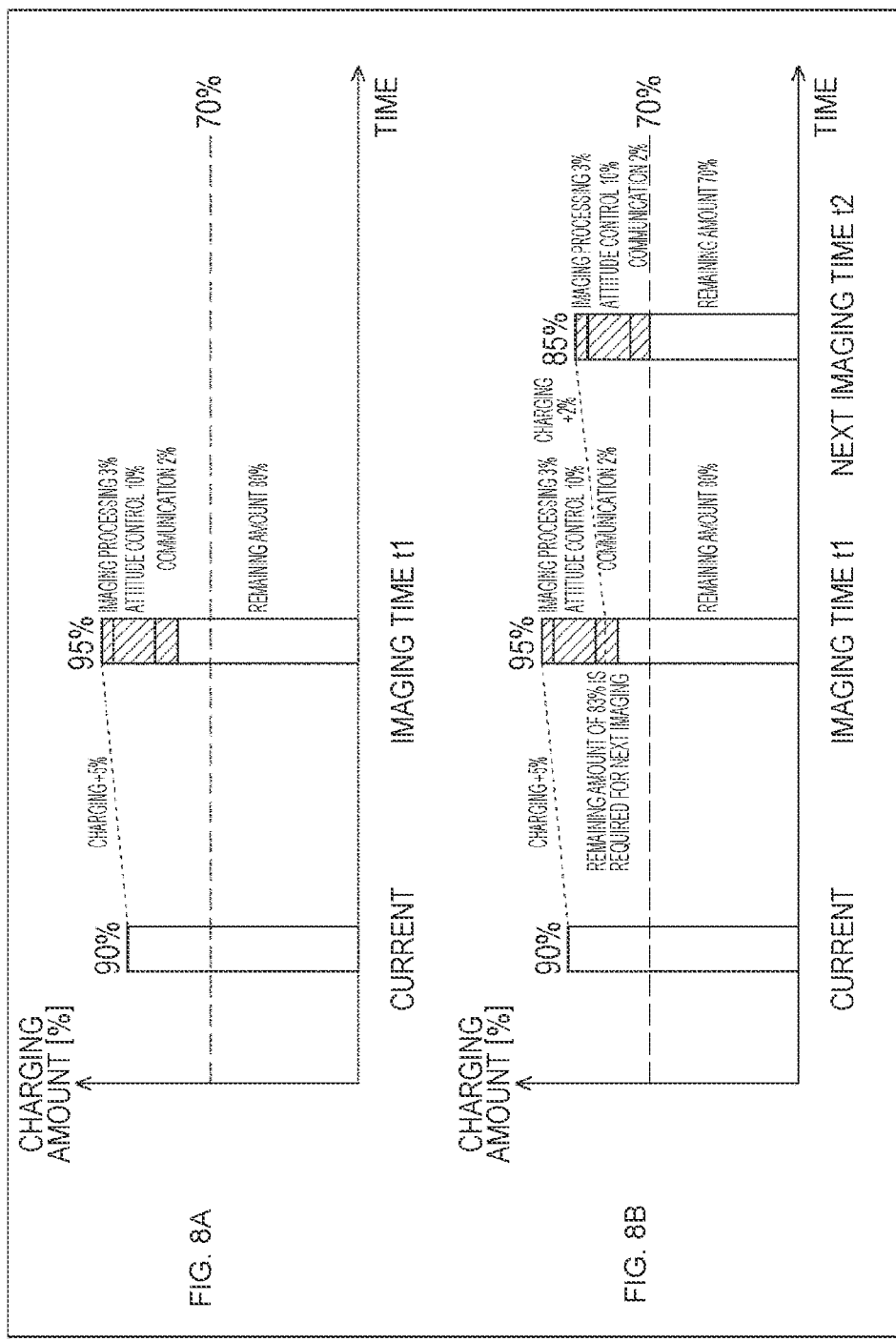
FIGS. 8A and 8B are views for explaining determination of a remaining battery amount.

For example, as illustrated in FIG. 8A, based on the premise that a charge amount of 70% with respect to a full charge amount of the battery 116 is always maintained, assuming that the current remaining battery amount is 90%, the charge amount until the time t1 is 5%, the power consumption by the imaging processing at the time t1 is 3%, the power consumption by the attitude control is 10%, and the power consumption by communication performed until the imaging time t1 is 2%, 90%+5%−3%−10%−2%=80% is obtained. Since the charge amount of 70% can be secured even after imaging at the time t1, the satellite 21 can be determined to have a sufficient remaining battery amount.

Note that the management unit 101 may determine whether the remaining battery amount is sufficient on the basis of the remaining battery amount to be left after the imaging time t1, also in consideration of imaging to be performed at a next timing of the imaging time t1.

For example, as illustrated in FIG. 8B, assuming that imaging is scheduled at a time t2 after the imaging time t1, the charge amount from the time t1 to the time t2 is 2%, the power consumption by the imaging processing at the time t2 is 3%, the power consumption by the attitude control is 10%, and the power consumption by the communication performed until the imaging time t2 is 2%, since the remaining battery amount of 83% is required after the imaging at the time t1, it is determined that the estimated remaining battery amount of 80% at the imaging time t1 is not a sufficient remaining battery amount.

Note that, in the example described above, the power consumption related to imaging has been mainly described, but other power consumption, for example, power consumption due to heat control associated with attitude control, periodic communication, and the like is also considered.

As described above, in a case where it is determined whether or not there is sufficient remaining battery amount and it is determined in step S52 of FIG. 7 that there is not a sufficient remaining battery amount, the process proceeds to step S53, and the satellite 21 determines whether an expected downlink timing can be changed by the imaging time t1. Changing the downlink timing makes it possible to save the amount of power required therefor.

In a case where it is determined in step S53 that the downlink timing cannot be changed, the process in step S53 is skipped, and the process proceeds to step S55.

Whereas, in a case where it is determined in step S53 that the downlink timing can be changed, the process proceeds to step S54, and the management unit 101 changes the downlink timing and determines whether this change allows a sufficient remaining battery amount to be secured. Also in step S54, in a case where it is determined that there is not a sufficient remaining battery amount, the process proceeds to step S55. Whereas, in a case where it is determined in step S54 that there is a sufficient remaining battery amount, the process proceeds to step S57.

In step S55, the management unit 101 changes accuracy of attitude control. In the attitude control, for example, in repeatedly applying a moment toward a target attitude with use of two types of a wheel and an ion engine and applying a reverse moment when the target attitude is exceeded, in a case where a swing speed becomes equal to or less than a certain value, it is determined that the attitude is changed to the target attitude. For example, the management unit 101 changes a range of a swing speed that is used for determining that the target attitude is obtained, as the change of the accuracy of the attitude control. By changing into a direction to increase the range of the swing speed and reducing a control amount of the attitude control, power consumption can be saved.

In step S56, the management unit 101 changes the imaging condition in accordance with the accuracy of the attitude control. When the range of the swing speed becomes large, the attitude of the satellite 21 is not stabilized to cause wobble, so that subject blurring may occur. Furthermore, since the pointing is insufficient, it is conceivable that sufficient zooming cannot be performed. Therefore, the management unit 101 compensates for an adverse effect due to the reduction in the control amount of the attitude control, by changing the imaging condition.

For example, the management unit 101 changes the imaging condition as follows.

The management unit 101 responds to subject blurring by increasing a shutter speed of the image sensor. Furthermore, since the captured image becomes dark when the shutter speed is increased, the management unit 101 may further perform control to increase sensitivity (gain).

Furthermore, for example, the management unit 101 can reduce resolving power (resolution) of the captured image for the purpose of improving sensitivity per unit pixel. As a result, the shutter speed can be improved, the influence of the reduction in the accuracy of the attitude control is unlikely to be received, and an amount of data at the time of downlink can be reduced. Furthermore, the management unit 101 selects a setting value with which optical zooming is not performed. This configuration makes it possible to increase tolerance for image blurring (wobble).

Furthermore, in a case where the camera module includes a mechanical blur correction mechanism (space blur correction), the mechanical blur correction mechanism may be performed instead of reducing the accuracy of the attitude control.

Furthermore, instead of reducing the resolving power (resolution) of the captured image, the management unit 101 may perform imaging setting so as to perform continuous capturing of a plurality of images. When a high-resolution captured image generated by synthesizing the captured images by the continuous capturing is generated and transmitted (downlinked) to the ground station 15, reduction in resolving power (resolution) of the captured image can be compensated. Note that the high-resolution image generation by the image synthesis may be performed by the satellite group management device 11 or the image analysis server 42 after the down-ring. The satellite group management device 11 or the image analysis server 42 can also perform synthesis with a captured image in the past such as a base image, and with a captured image captured by another satellite 21.

After step S56, or in a case where it is determined in step S52 or step S54 that there is a sufficient remaining battery amount, the process proceeds to step S57.

In step S57, the management unit 101 controls the attitude (performs pointing) of the satellite 21 or the imaging device 111 in accordance with the setting of the attitude control determined in the processing of step S55.

In step S58, the management unit 101 sets the imaging conditions determined in the process in step S56.

As described above, when the imaging preparation processing in step S33 in FIG. 6 ends and the imaging date and time designated by the imaging instruction comes, the process in step S34 in FIG. 6, that is, imaging on the imaging target position is performed.

According to the imaging preparation processing, by lowering the stable accuracy of attitude control greatly affecting the power consumption, and changing the imaging condition and the image processing in the subsequent stage in a case where the remaining battery amount is small, it is possible to ensure the quality of the captured image while suppressing battery consumption.

<4. Flowchart of Formation Flight>

Next, the formation flight executed by a plurality of satellites 21 included in one satellite group 31 will be described.

Figure 9:
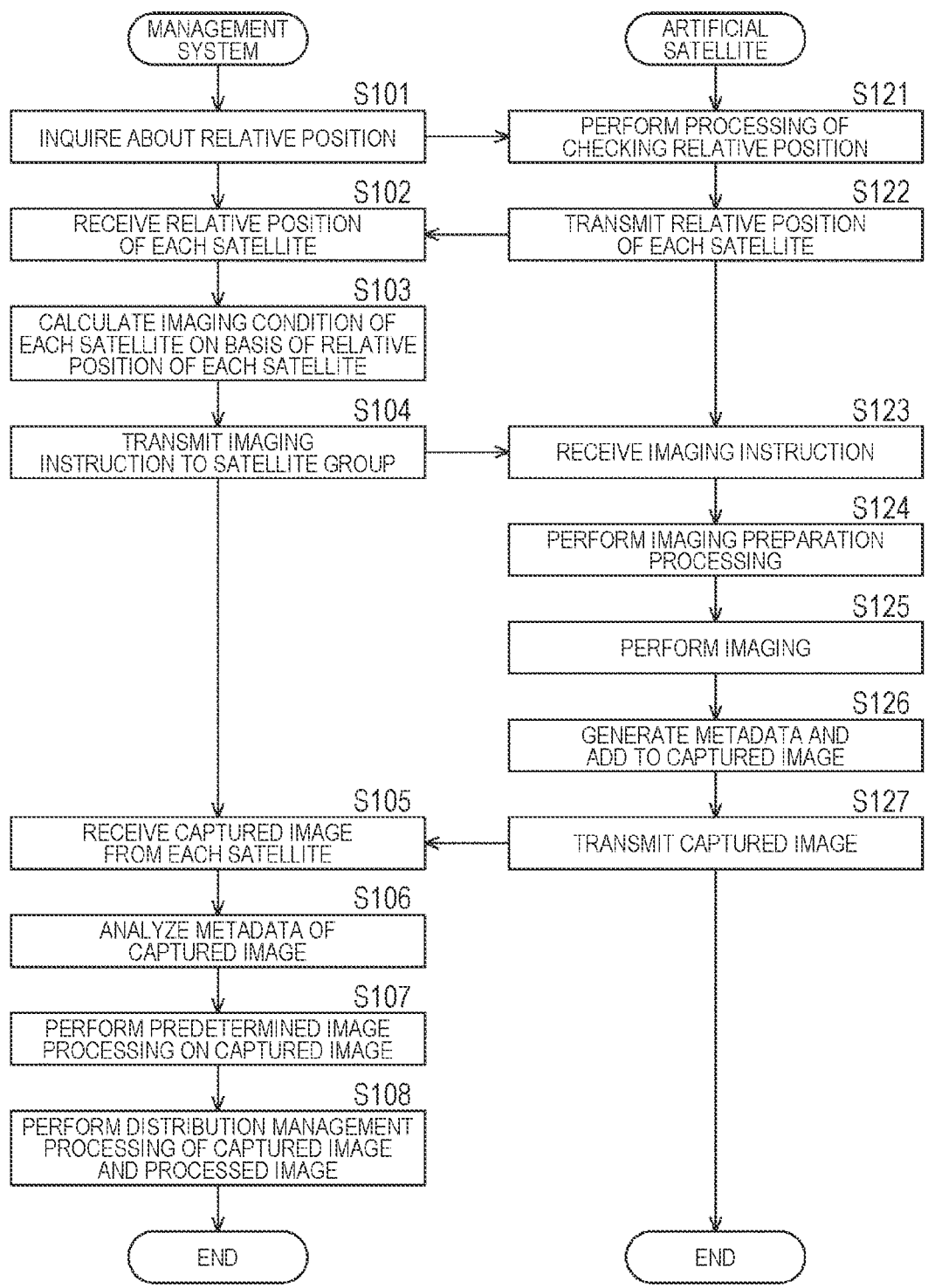
FIG. 9 is a flowchart of the satellite image processing system that performs formation flight.

FIG. 9 is a flowchart of the satellite image processing system 1 in which one satellite group 31 performs formation flight.

First, relative position checking processing in steps S101, S121, S122, and S102 is performed between the management system and each satellite 21 of the satellite group 31 that performs formation flight. That is, in step S101, the management system inquires, about a relative position, of each satellite 21 of the satellite group 31 that performs the formation flight. In step S121, each of the satellites 21 included in the satellite group 31 performs processing of checking the relative position in response to the inquiry from the management system. Then, in step S122, each satellite 21 transmits the relative position, and in step S102, the management system receives the relative position from each satellite 21. Here, the relative position is an arrangement order of the individual satellites 21 included in the satellite group 31 and a distance between the satellites. The arrangement order of the individual satellites 21 is, for example, an order in which a traveling direction of the satellite 21 is set as a head (No. 1). This relative position checking processing may be performed every time imaging is performed, or may be periodically performed, for example, once a day or once a week.

The management system has orbit information of the satellite group 31 acquired from NORAD as an external organization, but may not be able to discriminate orbit information of each satellite 21 included in the satellite group 31 in some cases. Alternatively, even if individual pieces of orbit information can be discriminated by observation from the ground, it may not be possible to discriminate the order of airframes in some cases. In the formation flight, there is a case where the satellite 21 is arranged in a range in which the orbit information cannot be individually allocated, and it is not possible to discriminate what number a certain satellite is from the head in the satellite group 31. Therefore, it is necessary to measure a relative positional relationship.

Methods for controlling the relative position are roughly classified into two types: an open-loop method and a closed-loop method.

The open-loop method is a method in which there is no communication between satellites included in the satellite group 31 and the relative position is controlled by an instruction from the ground side. An error is likely to occur in a distance between the satellites.

On the other hand, the closed-loop method is a method of controlling the relative position by performing communication between satellites included in the satellite group 31. The closed-loop method has higher accuracy in relative position than that of the open-loop method. The closed-loop method includes a centralized management type (centralized type) and a decentralized management type (decentralized type). In the central management type, there are a mode in which a satellite 21 serving as a leader is present and other satellites 21 follow the leader satellite, and a mode in which the leader satellite gives an instruction to other satellites 21. The decentralized management type is a mode in which each satellite 21 included in the satellite group 31 autonomously communicates with other surrounding satellites 21 and controls its own position.

For the processing of checking the relative position in step S121, there is a method in which, in the open-loop method, for example, individual satellites 21 simultaneously perform imaging of a predetermined point on the ground, and the satellite group management device 11 on the ground side checks the arrangement order of the satellites 21 on the basis of captured images and attitude (pointing angle) information of the satellites 21. Furthermore, for example, there is a method in which individual satellites 21 simultaneously perform communication with a predetermined point on the ground, and the communication device 13 on the ground side checks the arrangement order from a radio wave at that time. The communication for checking the arrangement order may be downlink of a predetermined captured image, or may be a signal for calibration or the like. Whereas, in the closed-loop method, each satellite 21 executes processing of measuring the relative position, and a measurement result is downlinked. As a method of measuring the relative position of each satellite 21, there are a method of measuring a position (direction) through communication between satellites, a method of irradiating a laser by the satellite 21 to measure a distance from reflected light thereof, and the like.

In the closed-loop method and the open-loop method, only the arrangement order of the individual satellites 21 may be detected, while the distance between the satellites may be calculated by observation from the ground.

In step S103, the management system calculates imaging conditions of each satellite 21 on the basis of the relative position of each satellite 21. The imaging conditions here include attitude control of the satellite 21 at the time of imaging, an imaging timing, and the like, in addition to set values of the image sensor. For example, in a case where three-dimensional measurement of the ground is performed, an imaging condition for causing each of the satellites 21 to have an attitude to achieve the same imaging target position is calculated using an inter-satellite distance as a baseline length. In a case where imaging with a time difference (differential imaging) is performed by the plurality of satellites 21 included in the satellite group 31, a timing (imaging position) at which the preceding satellite 21 and the subsequent satellite 21 perform imaging and an attitude at the time of imaging are calculated. The timing at which each satellite 21 performs imaging is calculated on the basis of an inter-satellite distance.

In step S104, the management system transmits an imaging instruction to each satellite 21 on the basis of the calculated imaging conditions. The imaging instruction is transmitted (multicast) to all the satellites 21 of the satellite group 31, but each satellite 21 can select the instruction addressed to the self by the individual ID as destination information included in the imaging instruction.

In step S123, the satellite 21 receives an imaging instruction from the ground station 15, performs imaging preparation processing in step S124, and performs imaging in step S125. Moreover, the satellite 21 generates and adds metadata to the captured image in step S126, and transmits (downlinks) the captured image added with the metadata to the ground station 15 in step S127.

The processes of steps S123 to S127 are basically similar to the processes of steps S31 to S36 performed by the individual satellites 21 described with reference to FIG. 6. Note that, in the transmission of the captured image in step S127, each satellite 21 may individually transmit its own captured image, or the captured images may be collected in the leader satellite through inter-satellite communication and collectively transmitted by the leader satellite.

In step S105, the management system receives the captured image from each satellite 21, and analyzes the metadata of the captured image in step S106. Moreover, in step S107, the management system performs predetermined image processing on the captured image, and in step S108, the management system executes the distribution management processing on the captured image and the processed image, and causes a predetermined storage unit to store.

The processes of steps S105 to S108 are basically similar to the processes of steps S16 to S19 performed by the management system described with reference to FIG. 6. However, in the image processing in step S107, not only image processing on a captured image obtained by one satellite 21 but also image processing using a plurality of captured images captured in cooperation by a plurality of satellites 21 of the satellite group 31 can be performed.

<5. Example of Image Processing>

A processing example of image processing executed by the satellite group management device 11 or the image analysis server 42 in step S18 in FIG. 6 or step S107 in FIG. 9 will be described.

The satellite group management device 11 or the image analysis server 42 can perform the following image processing on one captured image captured by each satellite 21.

(1) Generation of Metadata

Metadata can be generated on the basis of information transmitted from the satellite 21 or information on the satellite 21 that has performed imaging. For example, information on latitude and longitude of an imaging target position, information on attitude control and acceleration at the time of imaging by the satellite 21, and the like can be generated as metadata.

(2) Correction Processing of Captured Image

Correction processing can be performed, such as radiometric correction regarding sensitivity characteristics, geometric correction of an orbital position, an attitude error, and the like of the satellite 21, ortho-correction for correcting geometric distortion caused by a height difference of terrain, and map projection of performing image projection onto a map projection surface.

(3) Color Synthesis Processing

Color synthesis processing can be performed, such as pan-sharpening processing, true-color synthesis processing, false color synthesis processing, natural color synthesis processing, SAR image synthesis processing, and processing of adding a color to a captured image for each band.

(4) Other Image Synthesis

It is also possible to perform synthesis with a captured image captured by itself (satellite 21) in the past, a captured image captured by another satellite 21, or some base image, synthesis of captured images captured in different bands, synthesis with map information, and the like.

(5) Information Extraction

It is possible to calculate vegetation detection information such as normalized difference vegetation index (NDVI) and water detection information such as normalized difference water index (NDWI), with different bands such as red (R) and infrared (IR). It is possible to perform highlight processing of a specific subject such as a vehicle, a moving object, or a fish group, extraction of information on a specific band, a change point from previous imaging, and the like.

In particular, in a case of using a plurality of captured images captured by a plurality of satellites 21 that performs formation flight, the satellite group management device 11 or the image analysis server 42 can more effectively perform the following image processing.

(1) Resolution Enhancement or Quality Enhancement Processing

By superimposing a plurality of captured images, a captured image with improved resolving power can be generated. Furthermore, it is possible to generate a pansharped image obtained by combining a monochrome image and a color image, and a high-resolution captured image by synthesizing captured images with different imaging conditions such as, for example, different dynamic ranges or shutter speeds, different bands (wavelength bands), or different resolutions.

(2) Function Sharing

An index such as a normalized difference vegetation index (NDVI) can be calculated with different bands such as red (R) and infrared (IR).

(3) Three-Dimensional Measurement

Three-dimensional information can be obtained from a parallax image. Furthermore, accuracy of object recognition on the ground can be enhanced by the three-dimensional information. For example, it is possible to discriminate whether or not an object is a vehicle (even if it is not immediately recognized as a vehicle from the image in terms of resolving power, it can be estimated as a vehicle if the object on the road is not a pattern and is recognized as a three-dimensional object).

(4) Difference Measurement

A change between a first time and a second time can be extracted using a plurality of captured images captured from the same position with a time difference. Furthermore, imaging may be performed such that only a changed target is extracted and colored. Furthermore, for example, a moving speed of a ship or a vehicle can be calculated using a plurality of captured images, or a wind speed can be calculated from a movement of cloud or the like.

(5) Other Image Synthesis

It is also possible to perform synthesis with a captured image in the past or a captured image captured by another satellite 21, synthesis of captured images captured in different bands, synthesis with map information, and the like.

The satellite group management device 11 and the image analysis server 42 as the image processing device perform the above-described image processing on the basis of satellite specification information that specifies a satellite and is associated as metadata with a captured image captured by the satellite 21. In other words, since the satellite specification information is associated as metadata with the captured image, it is possible to perform image processing on a plurality of pieces by using a relative positional relationship among the plurality of satellites 21 in the formation flight. The satellite specification information includes at least a group ID for identifying the satellite group 31, an individual ID for identifying each of the satellites 21 included in the satellite group 31, and relative position information of each of the satellites 21 that perform formation flight.

Note that the image processing using the plurality of captured images captured by the formation flight has been described, but the above-described image processing may be performed on a plurality of captured images captured by a constellation instead of the formation flight. For example, image processing such as (1) resolution enhancement or quality enhancement processing, (3) three-dimensional measurement, and (5) other image synthesis may be performed on a plurality of captured images captured by a constellation.

(Image Format)

The processed image after the image processing and the captured image are stored in the storage unit and provided to the customer or the like by using, for example, the following image formats.

(1) CEOS

CEOS is a format standardized by the Committee on Earth Observation Satellites. CEOS includes "CEOS-BSQ" in which a file is divided for every band and "CEOS-BIL" in which a plurality of bands is multiplexed.

(2) HDF

HDF is a format developed at the National Center for Supercomputing Applications (NCSA) of the University of Illinois. A plurality of bands is grouped into one file so that data can be easily subjected to mutual exchange in various computer environments.

(3) Geo TIFF

Geo TIFF is a format in which information for remote sensing is added to a tagged image file format (TIFF). Since the format is the TIFF, Geo TIFF can be opened with a general image viewer or the like.

(4) JPEG2000

JPEG 2000 is an image format standardized by the Joint Photographic Experts Group. JPEG 2000 not only simply increases a compression rate, but also adopts a technique of improving an image of a region of interest and a copyright protection technique such as an electronic watermark.

As a method of presenting the processed image and the captured image, there are (1) a method of providing an image in a browsable manner and (2) a method of presenting only information based on analysis of an image.

Moreover, (1) the method of providing an image in a browsable manner includes: (1A) a method of providing (transmitting) an image itself; (1B) a method of allowing access on a platform, such as a data server, and allowing a user to browse an image for data on the platform; and (1C) a method of providing a user with dedicated software for browsing an image and allowing the user to browse only on the dedicated software.

(2) The method of presenting only information based on analysis of an image is, for example, a method of presenting the number of vehicles or moving objects for every time or presenting an area of a fish group, which are obtained by performing the above-described information extraction processing.

<6. Details of Metadata>

FIG. 10 illustrates an example of information to be given as metadata to a captured image or a processed image.

The information to be given as metadata includes, depending on a type of information, each piece of: information that can be added by the satellite 21; information that can be added by the satellite group management device 11; and information that can be added by the image analysis server 42 of the analysis company. In FIG. 10, each piece of information is arranged in a table format, and a circle (○) is given to a device that can add each piece of information. Note that, in a case where the satellite group management device 11 also has an image processing function, it goes without saying that the satellite group management device 11 itself can also add information that can be added by the image analysis server 42.

As the metadata, for example, information (satellite specification information) for specifying a satellite can be added. The information for specifying a satellite can include, for example, a group ID for identifying the satellite group 31, an individual ID for identifying individual satellites 21, relative position information of the individual satellites 21 included in the satellite group 31 that performs formation flight, angle information of the self (satellite 21) at the time of imaging, a satellite type, and the like. The relative position information includes, for example, information such as an order of the plurality of satellites 21 included in the satellite group 31 and a distance between the satellites. The relative position information may be information serving as a material for estimating a relative position. The angle information of the self at the time of imaging represents, for example, an angle of the self with respect to a ground surface at the time of imaging. The satellite type includes, for example, whether to be an optical satellite or an SAR satellite, classification by categorization such as application and a size of the satellite, and the like.

Furthermore, the information for specifying a satellite can include, for example, orbit information (TLE information) in the TLE format of the satellite 21, position information (GPS information) based on a GPS signal, orbital position/orbital altitude information calculated from at least one of TLE information or GPS information, speed information of the satellite 21, sensor information such as an earth sensor, a sun sensor, and a star tracker of the satellite 21, and the like.

Furthermore, information regarding imaging contents can be added to the metadata. The information regarding the imaging contents can include, for example, imaging target position information indicating a location on the earth as an imaging target, imaging conditions such as a resolution (resolving power), zoom, a shutter speed, sensitivity, and an aperture (f-number), a sensor type such as a model number of the image sensor, an imaging time, a satellite position at the time of imaging, weather information such as a cloud cover and a sunshine amount, and the like.

As the imaging target position information, for example, information on latitude and longitude of a location on the earth as an imaging target is given. The satellite position at the time of imaging is added on the ground side on the basis of orbit information of the satellite 21. The satellite position at the time of imaging may be the orbit information of the satellite 21 itself. Furthermore, in the above-described imaging preparation processing, there is a case where accuracy of attitude control is changed in accordance with a remaining battery amount. Therefore, the satellite position at the time of imaging may further include accuracy information of attitude control of the satellite 21 at the time of imaging, three-dimensional acceleration information indicating a movement of the satellite itself at the time of imaging, and the like. This information regarding the attitude control can be used as a reference for processing in high-resolution processing or the like on the captured image performed on the ground side.

Moreover, information regarding an image type can be added to the metadata. The information regarding the image type can include band information and image processing information.

The band information includes: wavelength information related to a wavelength band; color information indicating whether to be RGB (TrueColor), IR (infrared light), or monochrome, coloring information indicating that a specification target such as a plant is colored (False Color), analysis information indicating that the image indicates a normalized vegetation index (normalized difference vegetation index: NDVI) or a normalized difference water index (NDWI); and the like.

The image processing information includes a processing time, a processing level, a processing method, and the like of the image processing. The processing time indicates a time when the image processing has been performed. The processing level is divided into six stages from L0 to L5. L0 is a level indicating an uncorrected state where correction processing is not performed, L1 is a level where radiometric correction regarding sensitivity characteristics is performed, and L2 is a level where geometric correction of an orbital position, an attitude error, and the like of the satellite 21 is performed. In addition, there are a level where an image projection is performed on a map projection surface, a level where ortho-correction for correcting geometric distortion is performed, and the like. In the processing method, processing names such as pan-sharpening processing, true-color synthesis processing, and SAR image synthesis processing are described. In a processed image of the three-dimensional measurement, distinction between an L image (image for the left eye) and an R image (image for the right eye) may be described.

Moreover, to the metadata, related person information that is information regarding a related person of the captured image or the processed image can be added. The information regarding the related person includes, for example, information such as an owner of the satellite 21, a service operator operating a satellite remote sensing service, and a right holder of the captured image or the processed image. By adding the related person information as metadata to the captured image or the processed image, a related person of the captured image or the processed image can be managed by referring to or collating the related person of the captured image or the processed image, and authenticity of the image can be ensured.

<7. Details of Distribution Management Processing>

Next, a description is given to the distribution management processing of a captured image or a processed image executed by the satellite group management device 11 or the image analysis server 42 in step S19 in FIG. 6 and step S108 in FIG. 9.

The captured image and the processed image can be subjected to the following processing for managing distribution of data.

(1) Usage Limitation Processing

It is possible to perform processing so that the captured image and the processed image cannot be downloaded or displayed without permission, or perform processing for disabling downloading or displaying of the captured image and the processed image in a case where predetermined conditions such as an expiration date, the number of times of copying, and the number of times of display are satisfied. Furthermore, processing can be performed on the captured image and the processed image so that secondary processing such as image synthesis cannot be performed.

(2) Watermark

Processing of adding a watermark (electronic watermark) indicating that there is a copyright can be performed on the captured image and the processed image. Furthermore, it is possible to perform processing of adding, as a watermark, information that enables discrimination of an outflow path.

By performing the distribution management processing as described above, the authenticity of the image can be ensured, and leakage and inappropriate use of the captured image and the processed image can be prevented. At this time, a method for managing each piece of data and a usage mode of the data by using a blockchain may be adopted.

(Processing Example of Image Protection)

In a case where there is a user's request for privacy protection on the captured image and the processed image, or on an image showing an area whose disclosure is restricted (disclosure restriction area) or prohibited (prohibited area) by a law or the like of each country, such as a military facility or a public facility, the satellite group management device 11 or the image analysis server 42 can perform processing for protecting an image by a predetermined protection method. It suffices that whether or not the area is the protection target area is determined using the imaging target position information of the metadata.

Examples of the method for protecting the image include, for example, performing processing on an image of the protection target area such that a person other than an end user or a permitted user cannot perform resolution enhancement processing more than necessary. Alternatively, the resolution of the image of the protection target area may be lowered, or blurring may be applied. Furthermore, updating of the image of the protection target area may be stopped, and the image may be replaced with an image in the past to be displayed, or an image indicating protection may be superimposed.

In addition to a case where the image protection is executed in advance before the image is first provided to the user, processing can be performed later in a case where a privacy protection request is made, in a case where distribution of an unauthorized image is detected, or the like. In a case where distribution of an unauthorized image is detected, means to delete the captured image and the processed image that have been illicitly leaked can also be employed.

Since the satellite group management device 11 and the image analysis server 42 can handle the image protection processing as described above, it is possible to respond to a request for privacy protection and disclosure restriction of the user.

<8. Application Example of Formation Flight>

Hereinafter, an example of an image analysis processing using captured images captured by the plurality of satellites 21 included in the satellite group 31 by formation flight will be described.

(1) Germination Confirmation of Crops by Resolution Enhancement (Remote Sensing for Agriculture)

A resolution of several cm is required for observation for germination confirmation of crops. By synthesizing captured images of a plurality of satellites by formation flight, resolving power exceeding resolving power in a single machine can be achieved, and germination can be detected.

The satellite group 31 performs imaging with the same point of farmland as an imaging target position. Individual satellites 21 may simultaneously capture images from different positions, or may capture images from the same position with a time difference. In order to direct the imaging target position of each satellite 21 to the same point, it is necessary to grasp a satellite position in advance.

In the image synthesis processing, it is not necessary to be able to grasp which satellite 21 has captured each captured image. However, if it is possible to grasp which satellite 21 has performed the imaging, an angle and a time at the time of imaging can be discriminated, so that more efficient image synthesis can be performed.

For example, the Geo TIFF format can be used as a format of the processed image after synthesis, and the fact that it is a synthesized image by formation flight, and an imaging position, an imaging time, an imaging condition, and the like of each of the captured images as a synthesis source can be added as metadata. As the imaging position information, imaging position information of any captured image (representative captured image) as a synthesis source can be used.

(2) Confirmation of Growth Status of Crops by Three-Dimensional Measurement (Remote Sensing for Agriculture)

A growth status of crops is confirmed by an index such as NDVI, but can also be acquired by accurately acquiring height information with three-dimensional measurement.

The individual satellites 21 of the satellite group 31 simultaneously perform imaging with the same point, which is farmland, as an imaging target position, to obtain a parallax image. In order to obtain a distance between the satellites, which is a base length, relative position information of the satellite 21 is required. This relative position information may also be obtained simultaneously with downlink of the captured image instead of being obtained in advance.

In the image synthesis processing, it is not necessary to be able to grasp which satellite 21 has captured each captured image. However, if it is possible to grasp which satellite 21 has performed the imaging, an angle and a time at the time of imaging can be discriminated, so that more efficient image synthesis can be performed.

For the processed image after synthesis, for example, a format of a three-dimensional image including a set of an L image and an R image can be used, and the fact that it is a synthesized image by formation flight, and an imaging position, an imaging time, an imaging condition, and the like of each of the captured images as a synthesis source can be added as metadata. As the imaging position information, imaging position information of any captured image (representative captured image) as a synthesis source can be used. In addition to information of the three-dimensional measurement, a vegetation index such as NDVI or other information may be further added.

(3) Other Remote Sensing for Agriculture

For example, it is possible to accurately acquire height information for horizontal confirmation after tilling of farmland by three-dimensional measurement.

(4) Movement Detection of Fish Group (Marine Observation Remote Sensing)

Information regarding detection of a fish group and a moving direction and a moving speed of the fish group can be obtained.

The satellite group 31 performs imaging with the same point in the ocean as an imaging target position. Individual satellites 21 capture images from the same position with a time difference. In order to direct the imaging target position of each satellite 21 to the same point, it is necessary to grasp a satellite position in advance. In particular, in imaging in which the ocean having no target as a reference is set as the imaging target position, it is necessary to precisely align captured images of the respective satellites 21. Therefore, it is important to grasp a relative position and moving speed information of each satellite 21 in advance.

In the analysis processing of the captured image, alignment of the captured images of the individual satellites 21 and comparison processing of the fish group are performed on the basis of an imaging position (including angle information) and an imaging time. By the comparison processing, a moving speed of the fish group can be calculated from a time difference between imaging times of the two or more satellites 21 and a moving distance of the fish group.

As the image presented as an analysis processing image, for example, it is possible to adopt an image in which information indicating a moving direction and a moving speed of the fish group is displayed in a superimposed manner on a captured image (captured image of the predetermined satellite 21), as a base, of the fish group. Various pieces of information on the captured image as a base are added to the metadata.

As a result of the analysis processing, information may be presented describing a calculation method at a time of calculating a moving direction and a moving speed of the fish group, for example, a plurality of captured images capturing the fish group, and information such as an imaging time and a position of the fish group.

(5) Other Marine Observation Remote Sensing

For example, it is also possible to obtain information regarding a moving direction and a moving speed of a ship and observation information of an ocean current.

(6) Counting of Number of Vehicles (Economic Index Estimation)

An economic index (economic trend or sales prediction of a specific store) is calculated by examining a number of vehicles in a parking lot and a number of traveling vehicles on a road. By synthesizing captured images of a plurality of satellites by formation flight, it is possible to generate a high resolution captured image and to more accurately detect the number of vehicles or the number of traveling vehicles.

The satellite group 31 simultaneously performs imaging with the same point as an imaging target position. In order to direct the imaging target position of each satellite 21 to the same point, it is necessary to grasp a satellite position in advance. A plurality of captured images captured at the same time enables resolution enhancement of an image and acquisition of three-dimensional information based on a parallax image.

In the image synthesis processing, it is not necessary to be able to grasp which satellite 21 has captured each captured image. However, if it is possible to grasp which satellite 21 has performed the imaging, an angle and a time at the time of imaging can be discriminated, so that more efficient image synthesis can be performed. In synthesis of two or more captured images, a target object serving as a reference may be extracted from a road or a building in the image, and the two or more images may be aligned on the basis of the target object. The target object serving as a reference may be selected on the basis of height information.

In the image analysis processing, the number of vehicles or the number of traveling vehicles are calculated on the basis of a high-resolution captured image. The number of vehicles or the number of traveling vehicles may be efficiently calculated by increasing a resolution only in a specific region in the captured image. In a case where it is not possible to discriminate whether or not to be a vehicle in the two-dimensional image, it may be discriminated whether or not to be a vehicle on the basis of three-dimensional information including the height.

As the image presented as an analysis processing image, for example, an image can be adopted in which a captured image as a base (a captured image of a predetermined satellite 21) is colored with a color changed for every detection target area or every count target (a vehicle or a person), and the number of counts is displayed in a superimposed manner. Various pieces of information on the image as a base are given to the metadata.

As a result of the analysis processing, information such as imaging conditions of the image and a method of calculating the detection target object may be presented to the user.

Note that, while the example described above is an example of resolution enhancement by simultaneous imaging, a moving speed of the vehicle may be measured on the basis of captured images captured with a time difference, and traffic volume information before and after the imaging time may be estimated and presented.

(7) Other

By synthesizing captured images of a plurality of satellites by formation flight, three-dimensional information based on a parallax image can be acquired, and a three-dimensional map of a construction site or a residence can be created.

(8) Modified Example

A constellation of formation flight may also be adopted. That is, by putting the satellite group 31 that performs formation flight into a single or a plurality of orbital planes, it is possible to perform an operation of uniformly developing a service mainly over the entire sphere.

Image synthesis of a captured image by formation flight or a captured image of another satellite may be performed. For example, it is possible to perform image processing of superimposing and displaying moving-object information obtained in formation flight on a high-resolution image captured by a geostationary satellite.

<9. Second Embodiment of Satellite Image Processing System>

FIG. 11 illustrates a configuration example of the second embodiment of a satellite image processing system to which the present technology is applied.

In the first embodiment described above, the satellite group 31 that performs formation flight has a configuration to perform simultaneous imaging or time difference imaging at an imaging point and an imaging time instructed in advance on the basis of orbit information or the like of the satellite 21. Therefore, for example, it is not possible to detect a predetermined event having occurred on the ground and perform real-time imaging at the time of the event occurrence.

In a second embodiment described below, a description is given to a configuration in which one or more satellites 21 perform real-time imaging in accordance with an event having occurred on the ground. In a case where a satellite group 31 including a plurality of satellites 21 performs real-time imaging in accordance with an event having occurred on the ground, the satellite group 31 may be operated by either a constellation or formation flight.

As illustrated in FIG. 11, to the configuration of a satellite image processing system 1 of the second embodiment, a plurality of transmission devices 251 including a sensor that detects a predetermined event on the ground is newly added. In the example of FIG. 11, four transmission devices 251A to 251D are installed in an event detection region 250, but any number of transmission devices 251 may be adopted. Note that three satellites 21X to 21Z of the second embodiment illustrated in FIG. 11 may be operated by either a constellation or formation flight. Furthermore, the three satellites 21X to 21Z may be the satellites 21 each operated independently.

The four transmission devices 251A to 251D each share the event detection region 250 to detect an event.

A fan-shaped region indicated by a broken line in FIG. 11 indicates an event detection range of one transmission device 251. The event detection region 250 is farmland, for example, and a sensor included in the transmission device 251 monitors a temperature and the like of the farmland or monitors a growth status of crops.

The transmission device 251 detects a predetermined event in the event detection region 250, and transmits an imaging instruction to one or more satellites 21. The satellites 21X to 21Z perform imaging of the event occurrence region in accordance with the imaging instruction transmitted from the transmission device 251.

Figure 12:
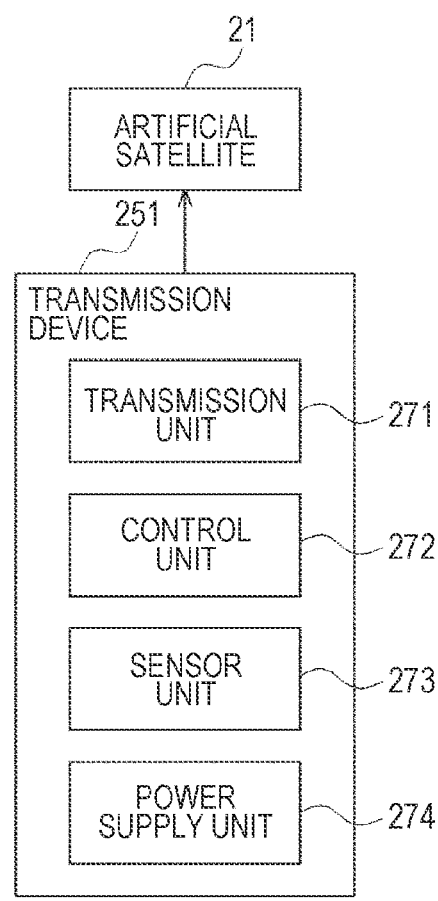
FIG. 12 is a block diagram illustrating a configuration example of a transmission device in the second embodiment.

FIG. 12 is a block diagram illustrating a configuration example of the transmission device 251.

The transmission device 251 includes a transmission unit 271, a control unit 272, a sensor unit 273, and a power supply unit 274.

Under the control of the control unit 272, the transmission unit 271 transmits an imaging instruction to the satellite 21 passing through the vicinity of the transmission device 251.

The transmission unit 271 is nondirectional, for example, and can transmit an imaging instruction to all the satellites 21 passing through a certain range of the transmission device 251. The transmission unit 271 includes, for example, a communication device capable of performing long-distance communication of 100 km or more for a high-speed moving object of 100 km/h, and having low power consumption.

The transmission unit 271 may have directivity. In this case, the transmission unit 271 directs an antenna (not illustrated) to the satellite 21 passing through the vicinity of the transmission device 251 on the basis of orbit information of the satellite 21, and transmits an imaging instruction to the target satellite 21. The orbit information of the satellite 21 is stored in advance.

The control unit 272 controls the entire operation of the transmission device 251. In a case where a predetermined event has been detected by the sensor unit 273, the control unit 272 controls the transmission unit 271 to transmit an imaging instruction to the satellite 21.

The sensor unit 273 includes one or more types of predetermined sensors according to a purpose of event detection. For example, the sensor unit 273 includes an odor sensor, an atmospheric pressure sensor, a temperature sensor, and the like. Furthermore, for example, the sensor unit 273 may include an image sensor (an RGB sensor, an IR sensor, or the like) that performs imaging of the event detection region 250. For example, when a detection value becomes a predetermined threshold value or more, the sensor unit 273 detects an occurrence of an event and notifies the control unit 272 of the occurrence of the event.

Note that the sensor unit 273 and the transmission unit 271 may be arranged in proximity, for example, or may be arranged apart from each other such that, for example, the transmission unit 271 is at a high place closest to the satellite 21, and the sensor unit 273 is arranged at a low place close to the ground.

To one transmission device 251, a plurality of sensors of different types may be mounted, or a plurality of sensors of the same type may be mounted. In a case where a plurality of sensors is mounted to the transmission device 251, there is a case where it is necessary to add, as transmission information, sensor information such as a sensor detection range as an imaging target position and a sensor detection type, and to transmit a sensor detection result.

The power supply unit 274 includes, for example, a battery or the like charged by solar power generation or the like, and supplies power to each unit of the transmission device 251.

The transmission device 251 is a communication device that is configured as described above and is capable of only one-way communication from the transmission device 251 to the satellite 21, but may also be a communication device capable of bidirectional communication including a direction from the satellite 21 to the transmission device 251.

In both unidirectional communication and bidirectional communication, in a case of nondirectional, since a transmission side does not need to direct the antenna toward the satellite 21 or a ground station 15 that is to be a reception side, it is particularly preferable in a case of transmitting from the ground to the satellite 21 in the sky. In the present embodiment, it is assumed that the transmission unit 271 of the transmission device 251 is nondirectional and the transmission device 251 is a device that performs unidirectional communication. However, needless to say that the transmission device 251 may be a device that is directional and performs bidirectional communication.

<10. First Event Imaging Sequence of Second Embodiment>

Next, a first event imaging sequence performed by the satellite image processing system 1 according to the second embodiment will be described with reference to a flowchart in FIG. 13.

First, in step S141, the control unit 272 of the transmission device 251 determines whether an event has been detected by the sensor unit 273. When the sensor unit 273 detects a predetermined event and notifies the control unit 272 of the occurrence of the event, the control unit 272 determines that an event has been detected. Therefore, in step S141, the control unit 272 waits until there is notification of an event occurrence from the sensor unit 273, and the process proceeds from step S141 to step S142 in a case where it is determined that an event has been detected.

In response to the occurrence of the event, in step S142, the control unit 272 controls the transmission unit 271 to transmit an imaging instruction to the satellite 21 passing through the vicinity of the transmission device 251. The transmission unit 271 transmits an imaging instruction in response to a command from the control unit 272.

Since the communication between the transmission device 251 and the satellite 21 is unidirectional communication only from the ground side to the satellite 21, the transmission device 251 cannot check whether or not the satellite 21 has received the imaging instruction. Therefore, for example, the transmission device 251 continues to transmit the imaging instruction for a certain period of time such as 30 minutes or 1 hour, or repeatedly transmits the imaging instruction intermittently at certain time intervals. In a case where the transmission device 251 and the satellite 21 can perform bidirectional communication, as in the imaging sequence described with reference to FIG. 6, it suffices that reception completion is received from the satellite 21, and the transmission of the imaging instruction is stopped. The reception completion from the satellite 21 to the transmission device 251 may include a fact that the satellite 21 performs imaging, to be transmitted.

Furthermore, in this imaging sequence, when detecting an occurrence of an event, the transmission device 251 transmits an imaging instruction without selecting the satellite 21. However, in a case where orbit information and imaging capability of the satellite 21 passing over the sky are known, the imaging instruction may be transmitted by designating, with a group ID or an individual ID, a satellite group 31 or a satellite 21 that satisfies required imaging conditions.

The imaging instruction from the transmission device 251 to the satellite 21 is added with, for example, imaging-related information such as a required imaging condition, a required imaging target position, a sensor ID, an event occurrence time, and a detected event type as a parameter, to be transmitted. The required imaging conditions include, for example, a resolution, a wavelength band (RGB, IR, and the like), and the like. The required imaging target position represents a region on the ground of the imaging target, and is a position corresponding to an event occurrence region of the sensor unit 273. As the required imaging target position, an installation position of the transmission device 251 or the sensor unit 273 may be stored. The sensor ID is sensor identification information for identifying the sensor unit 273 that has detected the event. The event occurrence time is a time at which the sensor unit 273 has detected the event, and corresponds to a time at which a requirement for an imaging instruction has occurred. The detected event type represents, for example, a type of an event detected by the sensor unit 273, such as detection of an abnormal temperature. As the detected event type, a sensor type may be stored instead of a specific detected event type.

In step S161, the satellite 21 receives the imaging instruction from the transmission device 251, and determines whether imaging by the self is possible in step S162. The satellite 21 checks whether or not the required imaging condition added to the imaging instruction is satisfied, and determines whether or not imaging by the self is possible. In a case where it is determined in step S162 that imaging by the self is not possible, the satellite 21 ends the process.

Whereas, in a case where it is determined in step S162 that imaging by the self is possible, the process proceeds to step S163, and the satellite 21 performs imaging preparation processing based on the received imaging instruction. Subsequently, the satellite 21 performs imaging in step S164, and generates metadata and adds to the captured image in step S165. Since individual processes of steps S163 to S165 are basically similar to individual processes of steps S33 to S35 of FIG. 6 described above, the details thereof will be omitted. The metadata can include a part or all of information received from the transmission device 251. For example, information such as a sensor ID representing the sensor unit 273 and an event occurrence time can be included as the metadata.

In step S166, it is determined whether the satellite 21 has reached a downlink point, in other words, whether the satellite 21 has reached within a range that allows communication with the communication device 13 of the ground station 15. The satellite 21 repeats the process of step S166 until it is determined that the downlink point has been reached, and the process proceeds to step S167 in a case where it is determined that the downlink point has been reached.

In step S167, the satellite 21 transmits (downlinks) the captured image added with the metadata, to the ground station 15. The downlink may be performed via a relay satellite 22.

In step S181, a management system receives a captured image from the satellite 21. That is, the communication device 13 receives the captured image via an antenna 14, and supplies to a satellite group management device 11. After receiving the captured image, the management system performs processing similar to steps S17 to S19 in FIG. 6, but the description thereof will be omitted because the description will be redundant.

<11. Second Event Imaging Sequence According to Second Embodiment>

Next, a second event imaging sequence performed by the satellite image processing system 1 according to the second embodiment will be described with reference to a flowchart in FIG. 14.

In the first event imaging sequence described above, each satellite 21 individually determines whether or not imaging is possible, and transmits a captured image to the communication device 13 on the ground in a case where imaging is performed.

Figure 14:
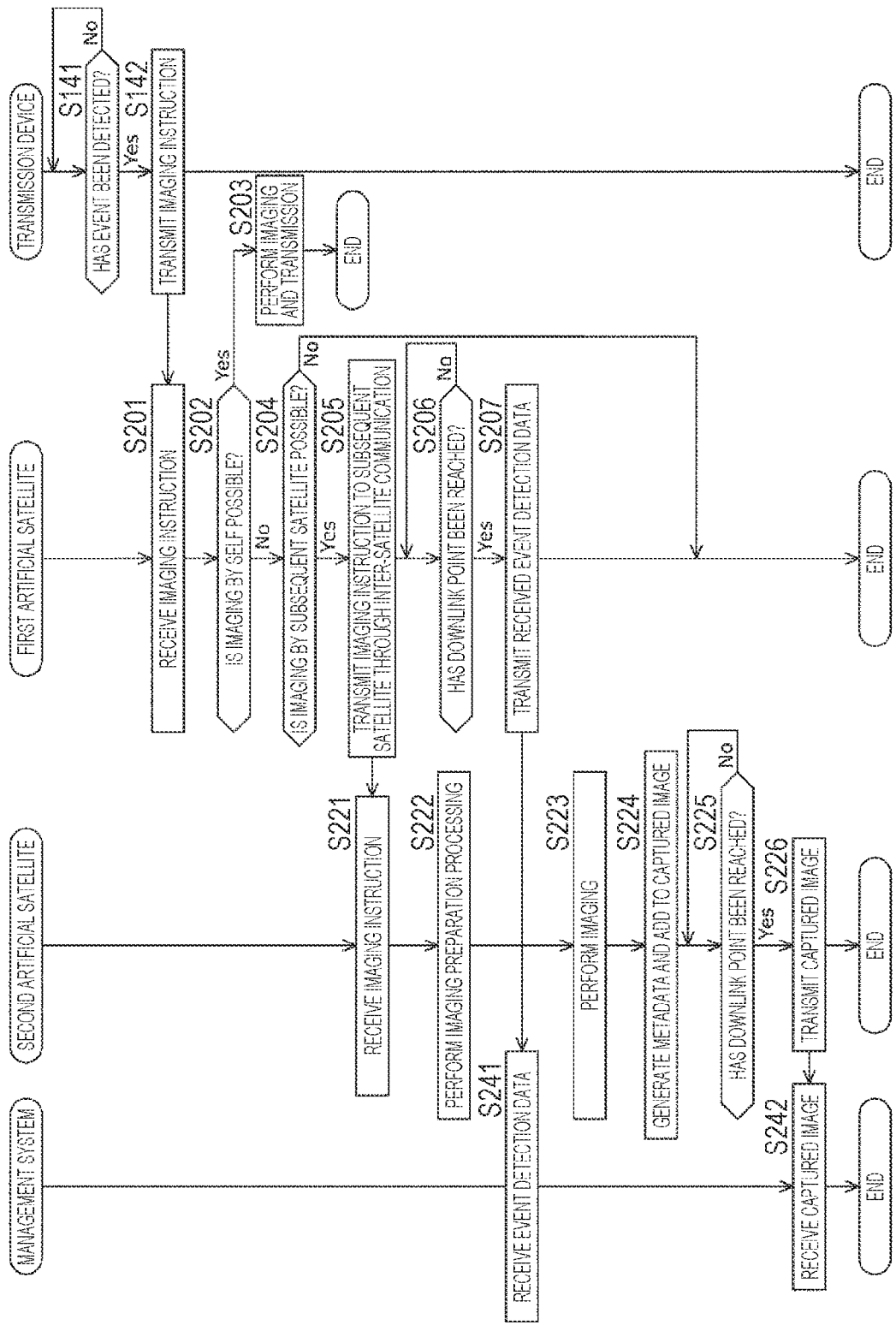
FIG. 14 is a flowchart for explaining a second event imaging sequence by the satellite image processing system according to the second embodiment.

In the second event imaging sequence in FIG. 14, processing is added in which a subsequent satellite 21 takes over the imaging instruction in a case where the satellite 21 having received the imaging instruction determines that imaging by the self is not possible. The subsequent satellite 21 is, for example, a satellite 21 belonging to the same satellite group 31 operated in a constellation or formation flight. In the following second event imaging sequence, the satellite 21 that receives an imaging instruction is referred to as a first satellite 21, and the subsequent satellite 21 that takes over the imaging instruction is referred to as a second satellite 21, to be distinguished.

Detection of an event occurrence and transmission of the imaging instruction by the transmission device 251 in steps S141 and S142 are the same as those in the first event imaging sequence described above.

In step S201, the first satellite 21 receives the imaging instruction from the transmission device 251, and determines whether imaging by the self is possible in step S202. In a case where it is determined in step S202 that imaging by the self is possible, the process proceeds to step S203, the first satellite 21 performs imaging based on the imaging instruction and transmission, and the process ends. Since the imaging sequence in a case where it is determined that imaging by the self is possible is the same as that of the first event imaging sequence described above, the description thereof will be omitted.

Whereas, in a case where it is determined in step S202 that imaging by the self is not possible, the process proceeds to step S204, and the first satellite 21 determines whether imaging by the subsequent second satellite 21 belonging to its own satellite group 31 is possible. In a case where it is determined in step S204 that imaging by the second satellite 21 is not possible, the process ends.

In a case where it is determined in step S204 that imaging by the second satellite 21 is possible, the process proceeds to step S205, and the first satellite 21 transmits an imaging instruction to the subsequent second satellite 21 through inter-satellite communication.

Then, in step S206, the first satellite 21 determines whether the downlink point has been reached, and repeats the process of step S206 until it is determined that the downlink point has been reached.

Then, in a case where it is determined in step S206 that the downlink point has been reached, the process proceeds to step S207, and the first satellite 21 transmits (downlinks) event detection data included in the imaging instruction received from the transmission device 251, to the ground station 15. The event detection data includes a part or all of the imaging-related information included in the imaging instruction, information indicating that the imaging instruction has been transferred to the subsequent satellite, and information indicating the subsequent second satellite 21 to which the imaging instruction has been transferred. The downlink may be performed via the relay satellite 22 similarly to other processing described above. The processing of the first satellite 21 ends as described above.

The subsequent second satellite 21 to which the imaging instruction has been transmitted from the first satellite 21 through inter-satellite communication receives the imaging instruction in step S221, and performs the imaging preparation processing based on the received imaging instruction in step S222.

Figure 13:
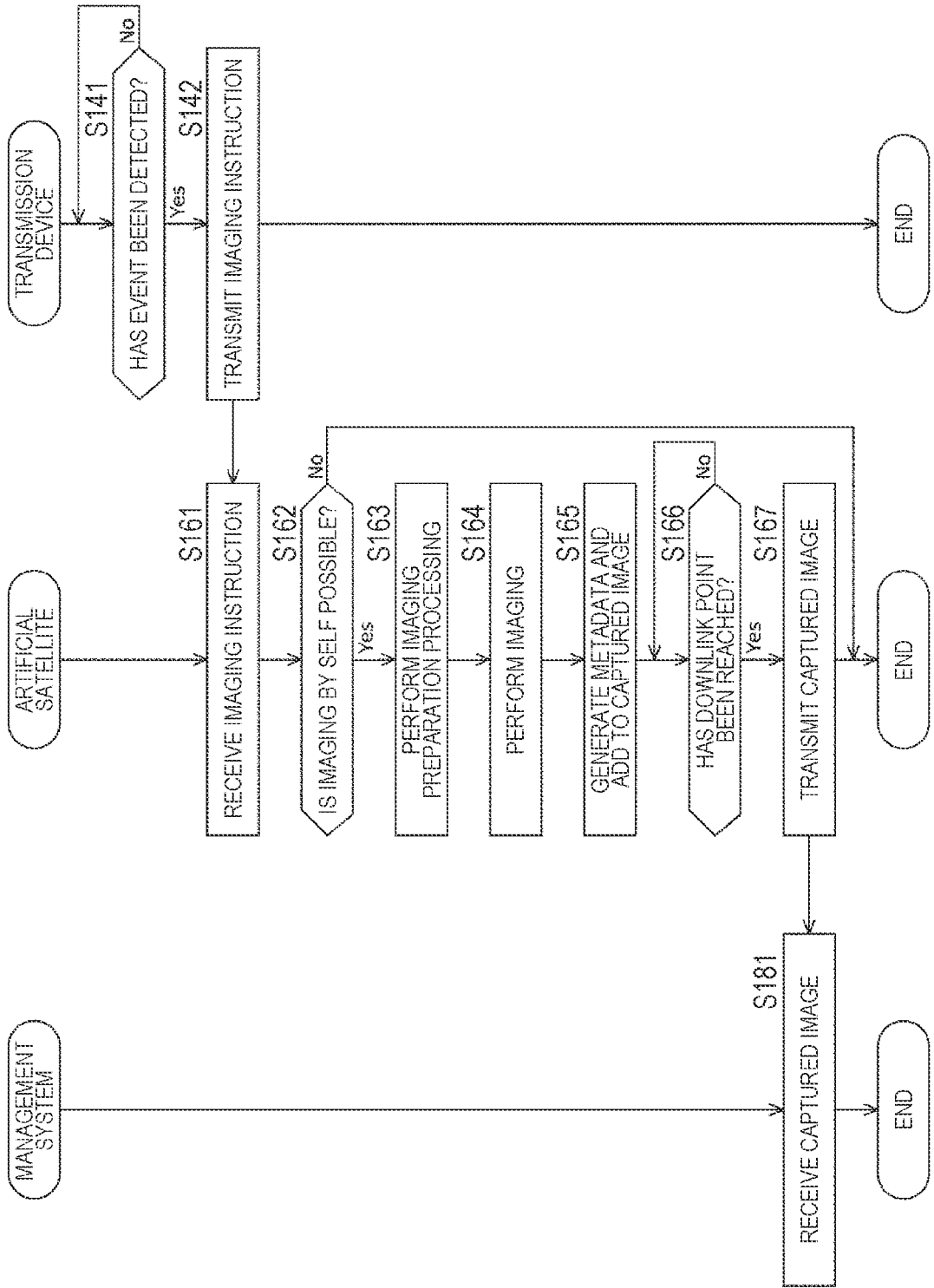
FIG. 13 is a flowchart illustrating a first event imaging sequence by the satellite image processing system of the second embodiment.

The processes in steps S223 to S226 are similar to the processes in steps S164 to S167 in FIG. 13. By the processes of steps S223 to S226, a captured image and metadata are generated by performing imaging, and the captured image to which the metadata is added is transmitted to the ground station 15 at the time when the downlink point is reached.

Whereas, the management system receives event detection data in step S241 in response to transmission of the event detection data by the first satellite 21. Furthermore, in response to transmission of the captured image by the second satellite 21, the captured image is received in step S242. After receiving the captured image, the management system performs processing similar to steps S17 to S19 in FIG. 6, but the description thereof will be omitted because the description will be redundant.

<12. Third Event Imaging Sequence According to Second Embodiment>

Figure 15:
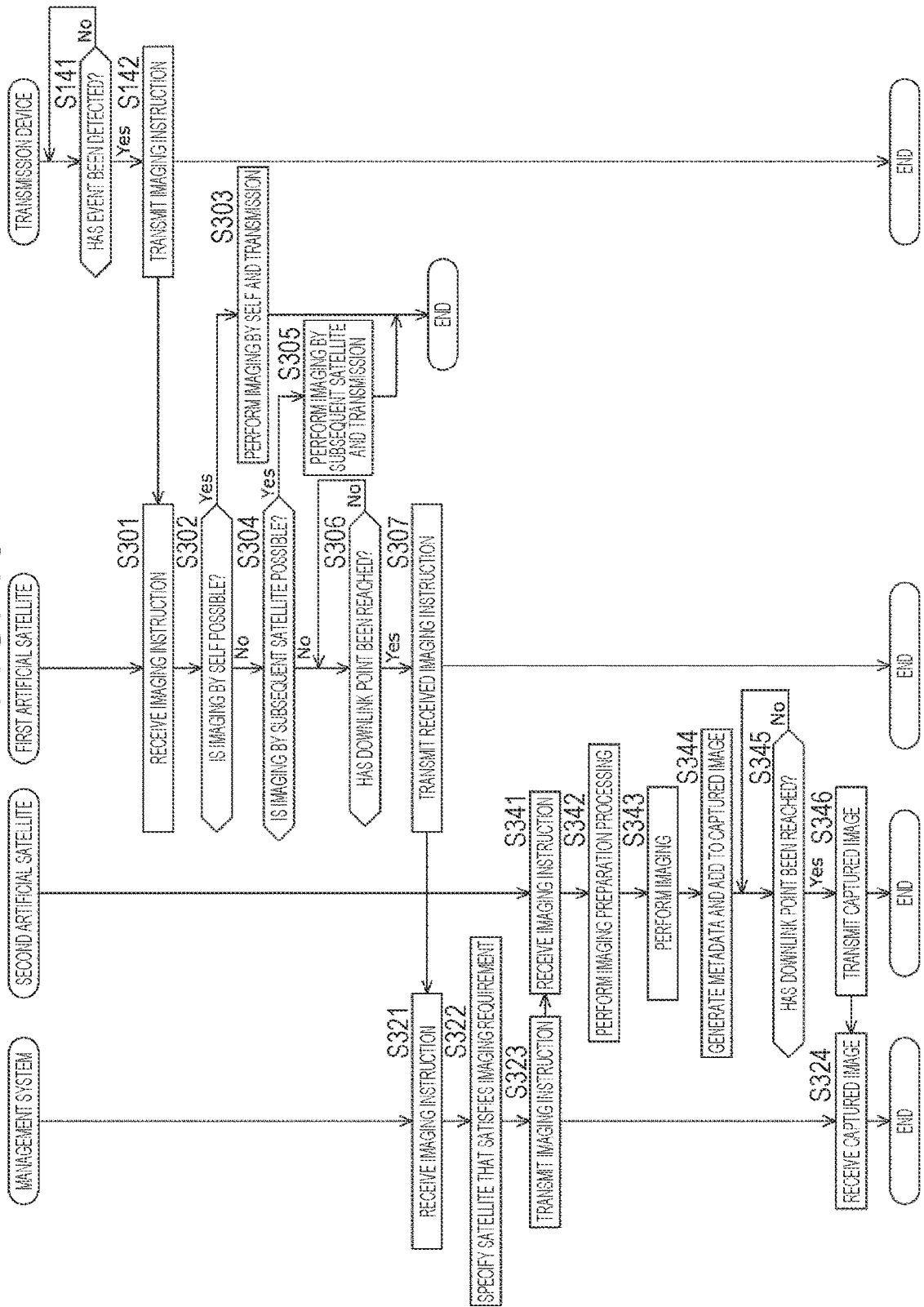
FIG. 15 is a flowchart illustrating a third event imaging sequence by the satellite image processing system according to the second embodiment.

Next, a third event imaging sequence performed by the satellite image processing system 1 according to the second embodiment will be described with reference to a flowchart in FIG. 15.

In the second event imaging sequence described above, the imaging instruction is transferred from the first satellite 21 to the second satellite 21 by using inter-satellite communication. The third event imaging sequence is an example in which an imaging instruction is transferred from the first satellite 21 to the second satellite 21 through communication via the ground station 15.

Detection of an event occurrence and transmission of the imaging instruction by the transmission device 251 in steps S141 and S142 are the same as those in the first event imaging sequence described above.

In step S301, the first satellite 21 receives the imaging instruction from the transmission device 251, and determines whether imaging by the self is possible in step S302. In a case where it is determined in step S302 that imaging by the self is possible, the process proceeds to step S303, the first satellite 21 performs imaging based on the imaging instruction and transmission, and the process ends. Since the imaging sequence in a case where it is determined that imaging by the self is possible is the same as that of the first event imaging sequence described above, the description thereof will be omitted.

Whereas, in a case where it is determined in step S302 that imaging by the self is not possible, the process proceeds to step S304, and the first satellite 21 determines whether imaging by the subsequent satellite 21 belonging to its own satellite group 31 is possible. In a case where it is determined in step S304 that imaging by the subsequent satellite 21 is possible, the process proceeds to step S305, imaging by the subsequent satellite 21 and transmission are performed, and the process ends. Since the imaging sequence in a case where it is determined that imaging by the subsequent satellite 21 is possible is the same as that of the second event imaging sequence described above, the description thereof will be omitted.

In a case where it is determined in step S304 that imaging by the subsequent satellite 21 is not possible, the process proceeds to step S306, and the first satellite 21 determines whether the downlink point has been reached, and repeats the process of step S306 until it is determined that the downlink point has been reached.

Then, in a case where it is determined in step S306 that the downlink point has been reached, the process proceeds to step S307, and the first satellite 21 transmits (downlinks) the imaging instruction received from the transmission device 251, to the ground station 15. The downlink may be performed via the relay satellite 22 similarly to other processing described above. The processing of the first satellite 21 ends as described above.

In response to the transmission of the imaging instruction by the first satellite 21, the management system receives the imaging instruction in step S321. Then, in step S322, the management system specifies another satellite 21 that satisfies the imaging requirements, on the basis of the required imaging condition, the required imaging target position, and the like included in the imaging-related information of the imaging instruction. Here, the second satellite 21 is specified as the another satellite 21.

In step S323, the management system transmits an imaging instruction to the specified second satellite 21. Note that (the communication device 13 of) the ground station 15 that receives the imaging instruction from the first satellite 21 may be the same as or different from (the communication device 13 of) the ground station 15 that transmits the imaging instruction to the second satellite 21.

In step S341, the second satellite 21 receives the imaging instruction from the ground station 15. The subsequent processes in steps S342 to S346 are similar to the processes in steps S222 to S226 in FIG. 14, and thus description thereof will be omitted. In step S346, the captured image is transmitted from the second satellite 21 to the management system.

In step S324, the management system receives the captured image, and the third event imaging sequence ends.

In the third event imaging sequence described above, the first satellite 21 transmits an imaging instruction to the ground station 15 in a case where it is determined that imaging by the subsequent satellite 21 is not possible. However, the imaging instruction may be transmitted to the ground station 15 in a case where it is determined that imaging by the self is not possible without determination as to whether or not imaging by the subsequent satellite 21 is possible.

According to the third event imaging sequence, even if the required imaging target position is a location where connection to a network is not possible, such as on the sea, an imaging instruction can be transferred to the management system via the first satellite 21, and imaging can be performed by the second satellite 21.

<13. Another Configuration Example of Transmission Device>

The transmission device 251 illustrated in FIG. 12 has incorporated a sensor that detects an occurrence of an event, and has been integrated with the transmission unit that transmits an imaging instruction. However, the sensor that detects an occurrence of an event and the transmission device that transmits an imaging instruction can be configured as separate devices.

Figure 16:
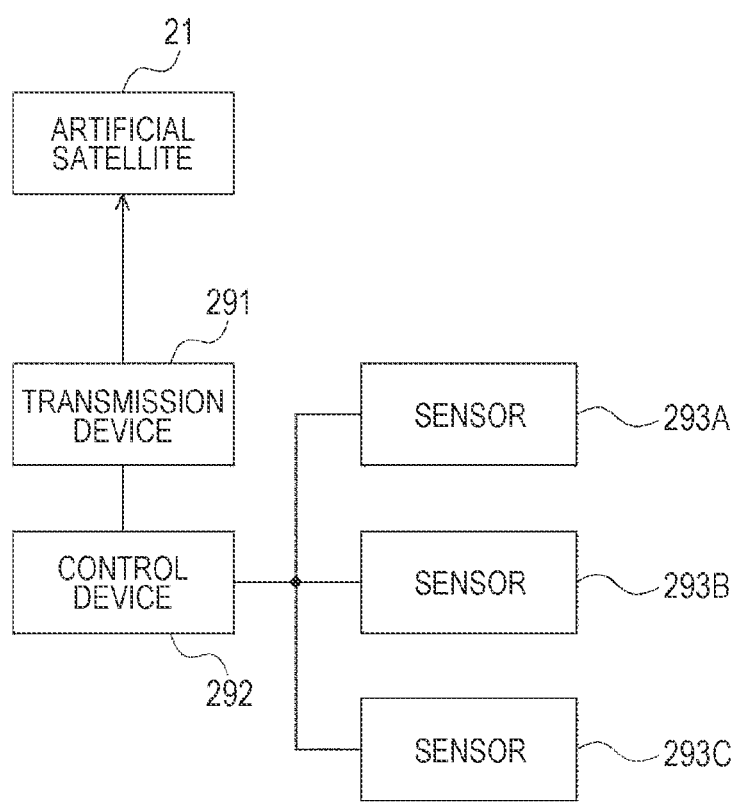
FIG. 16 is a block diagram illustrating another configuration example of the transmission device in the second embodiment.

FIG. 16 is a block diagram illustrating another configuration example of the transmission device in the second embodiment.

In the event detection region 250 (FIG. 11), a transmission device 291, a control device 292, and one or more sensors 293 are installed. FIG. 16 illustrates an example in which a number of sensors 293 is three, that is, sensors 293A to 293C, but any number of sensors 293 may be adopted. Furthermore, a plurality of sets of the transmission device 291, the control device 292, and one or more sensors 293 may be installed in the event detection region 250.

Under the control of the control device 292, the transmission device 291 transmits an imaging instruction to the satellite 21 passing through the vicinity of the transmission device 291.

In a case where a predetermined event has been detected by any of the plurality of sensors 293 (293A to 293C), the control device 292 performs control to acquire an event detection result from the sensor 293, generate an imaging instruction, and cause the transmission device 291 to transmit the imaging instruction. To this imaging instruction, imaging-related information is added as a parameter similarly to the example described above.

Each of the plurality of sensors 293 (293A to 293C) corresponds to the sensor unit 273 described above, detects an occurrence of an event, and notifies the control device 292 of the occurrence of the event. The plurality of sensors 293 may include different types of sensors or the same type of sensors. The plurality of sensors 293 may be arranged close to each other or may be arranged apart from each other. Furthermore, the plurality of sensors 293 may be arranged close to or apart from the transmission device 291 and the control device 292. To the notification of the event occurrence from the sensor 293 to the control device 292, the above-described sensor information is added as necessary.

In the satellite image processing system 1 of the second embodiment, even in a case where the transmission device 291 and the sensor 293 are configured as separate devices as described above, the first to third event imaging sequences described above are similarly executable.

<14. Application Example of Satellite Image Processing System Using Event Detection Sensor>

Hereinafter, an application example of a satellite image processing system using an event detection sensor of the second embodiment will be described.

(1) Event Detection in Farmland

A plurality of sensors (the transmission device 251 including the sensor unit 273 or the sensor 293) is installed at regular intervals in a predetermined observation region of farmland, and each of the plurality of sensors detects abnormality such as pest generation and disease generation. The transmission device 251 or 291 transmits an imaging instruction to the satellite 21 in accordance with a detection result of the abnormality of the farmland as an event. The satellite 21 performs, for example, imaging of RGB, imaging of red (R) and infrared (IR) for a vegetation index such as NDVI, and the like. To a required imaging target position added to the imaging instruction, a sensor detection range of the sensor having detected the abnormality is assigned. In the observation region in which the plurality of sensors is arranged, the satellite 21 having received the imaging instruction may perform imaging of only the sensor detection range of the sensor in which the abnormality has occurred, or may to perform wide-area imaging of the entire observation region. Furthermore, by changing an imaging condition such as zooming, it is possible to perform both imaging of the sensor detection range of the sensor having detected the abnormality and wide-area imaging of the entire observation region.

Instead of detection of an abnormality, an imaging instruction can also be given to the satellite 21 by using, as a trigger, an occurrence of a predetermined situation for checking a growth status such as, for example, a fact that a ground surface is in a predetermined environmental state (for example, a temperature of the ground surface has reached a predetermined temperature), a fact that a photosynthesis amount or a growth situation of the plant is in a predetermined state, and a fact that germination is detected.

(2) Event Detection in Ocean

For example, a buoy incorporating the transmission device 251 including the sensor unit 273 is released to a marine investigation target sea region. The sensor unit 273 detects a predetermined condition such as detection of a fish group, a sea water temperature, an ocean current speed, or a wind speed. Then, the transmission device 251 transmits an imaging instruction to the satellite 21 on the basis of a detection result of the event. Imaging-related information of the imaging instruction includes a required imaging condition, a required imaging target position, an event occurrence time, and the like. Since the satellite 21 capable of imaging a nighttime state is limited, the satellite 21 is selected on the basis of the required imaging condition, and a situation of the imaging target sea region is analyzed on the basis of a captured image.

(3) Observation of Unmanned Zone

A sensor (the transmission device 251 including the sensor unit 273 or the sensor 293) is installed in an unmanned zone such as a forest, a mountain, or a desert, to detect a change in climatic conditions, detection of organisms to be observed, and an abnormality such as forest fire. The satellite 21 performs imaging on the basis of an imaging instruction from the transmission device 251 or 291. A situation of the unmanned zone is analyzed on the basis of a captured image.

(4) Accident Observation

For example, the transmission device 251 is mounted on a black box of an airplane or a ship, and the transmission device 251 transmits an imaging instruction in an event of an emergency such as an airplane crash, ship stranding, or an oil tanker leakage. The satellite 21 promptly captures an image of an emergency occurrence location and transmits the image to the ground station 15.

(5) Climber Distress

A climber or the like carries the transmission device 251, and, at the time of distress, an imaging instruction including a rescue signal as a detected event type and added with imaging-related information including a distress occurrence location as a required imaging target position is transmitted from the transmission device 251 to the satellite 21. The satellite 21 captures an image of the distress occurrence location on the basis of the imaging instruction, and transmits the image to the ground station 15.

(6) Pipeline Emission Control

Sensors are attached to a pipeline at predetermined intervals, and an occurrence of leakage is monitored. In a case where leakage is detected, an imaging instruction is transmitted to the satellite 21. As a required imaging condition, for example, an imaging instruction added with imaging-related information designating a satellite 21 capable of leakage detection, such as the satellite 21 capable of heat detection by an IR band, is transmitted, and a satellite 21 that satisfies the requirement performs imaging. It is possible to promptly observe the leakage situation in the leakage area on the basis of the captured image. In particular, in a case where an outflow from the pipeline is caused by a human cause, prompt observation after the event occurrence is effective.

(7) Other

A captured image triggered by the sensor 293 arranged on the ground may be made as only primary information, and image analysis or the like may be performed by combining the captured image and another image. For example, a captured image with a trigger from the sensor 293 is promptly captured by the low-performance satellite 21 with priority given to an imaging timing. Thereafter, the satellite group management device 11 schedules the satellite 21 having a higher imaging capability, and performs high-resolution and high-accuracy imaging. The satellite group management device 11 performs analysis by using a first captured image captured by a low-performance satellite 21 and a second captured image captured by a satellite 21 having a high imaging capability. For example, the satellite group management device 11 may perform resolution enhancement on the first captured image on the basis of difference information, or may perform synthesis processing on the first captured image and the second captured image.

As described above, according to satellite remote sensing using a sensor, an event having occurred on the ground can be detected by the sensor, and an imaging instruction can be directly given to the satellite 21 in the sky. In particular, even from a sensor installed in a zone without connection to the Internet such as the ocean, an imaging instruction can be directly given to a satellite, or an imaging instruction can be given to another satellite via the satellite. For example, since it is possible to immediately detect an event occurring at a specific location in a vast zone and cause imaging to be performed, efforts can be greatly reduced.

<15. Computer Configuration Example>

The series of processes described above can be executed by hardware or also executed by software. In a case where the series of processes are performed by software, a program that configures the software is installed in a computer. Here, examples of the computer include, for example, a microcomputer that is built in dedicated hardware, a general-purpose personal computer that can perform various functions by being installed with various programs, and the like.

Figure 17:
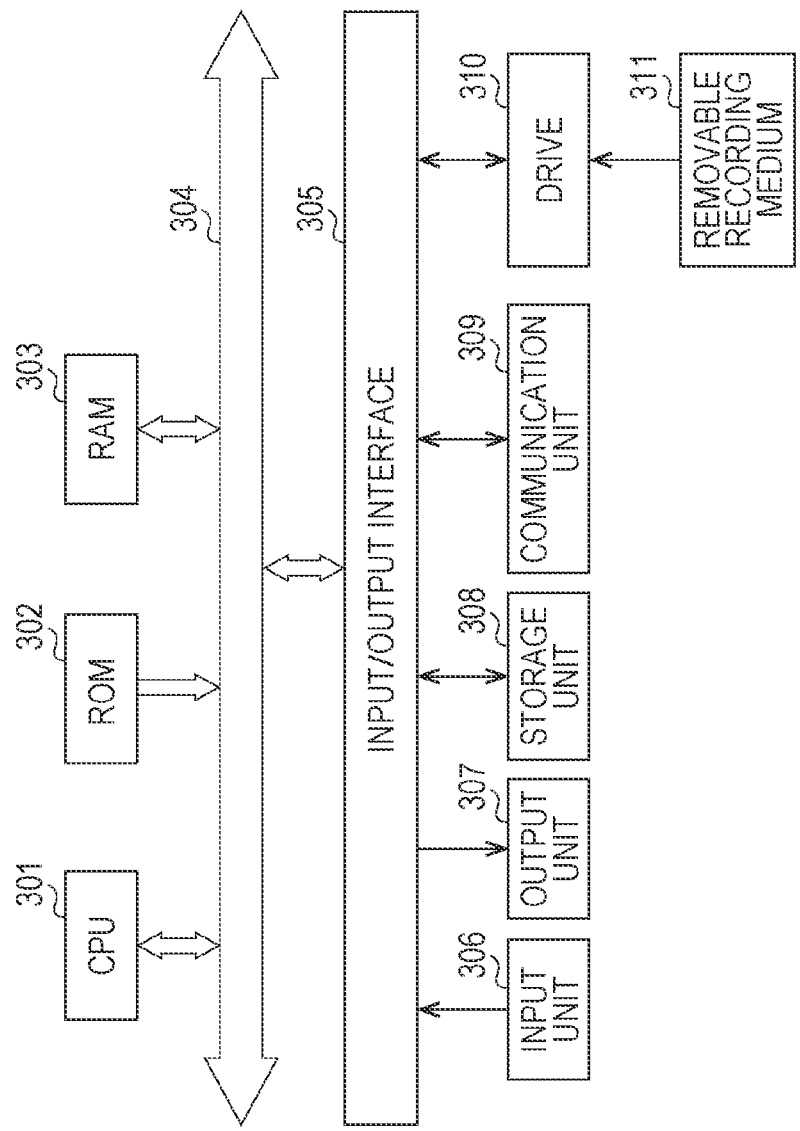
FIG. 17 is a block diagram illustrating a configuration example of an embodiment of a computer to which the present technology is applied.

FIG. 17 is a block diagram illustrating a configuration example of hardware of a computer that executes the series of processes described above in accordance with a program.

In a computer, a central processing unit (CPU) 301, a read only memory (ROM) 302, and a random access memory (RAM) 303 are mutually connected by a bus 304.

The bus 304 is further connected with an input/output interface 305. To the input/output interface 305, an input unit 306, an output unit 307, a storage unit 308, a communication unit 309, and a drive 310 are connected.

The input unit 306 includes a keyboard, a mouse, a microphone, a touch panel, an input terminal, and the like. The output unit 307 includes a display, a speaker, an output terminal, and the like. The storage unit 308 includes a hard disk, a RAM disk, a nonvolatile memory, and the like. The communication unit 309 includes a network interface or the like. The drive 310 drives a removable recording medium 311 such as a magnetic disk, an optical disk, a magneto-optical disk, or a semiconductor memory.

In the computer configured as described above, the series of processes described above are performed, for example, by the CPU 301 loading a program recorded in the storage unit 308 into the RAM 303 via the input/output interface 305 and the bus 304, and executing. The RAM 303 also appropriately stores data necessary for the CPU 301 to execute various processes, for example.

The program executed by the computer (CPU 301) can be provided by being recorded on, for example, the removable recording medium 311 as a package medium or the like. Furthermore, the program can be provided via a wired or wireless transmission medium such as a local area network, the Internet, or digital satellite broadcasting.

In the computer, by attaching the removable recording medium 311 to the drive 310, the program can be installed in the storage unit 308 via the input/output interface 305. Furthermore, the program can be received by the communication unit 309 via a wired or wireless transmission medium, and installed in the storage unit 308. Besides, the program can be installed in advance in the ROM 302 and the storage unit 308.

In this specification, the steps described in the flowcharts can be performed in time series according to the described order as a matter of course, but are not necessarily performed in time series, and may be performed in parallel or at necessary timing such as when a call is made.

Furthermore, in this specification, the system means a set of a plurality of components (a device, a module (a part), and the like), and it does not matter whether or not all the components are in the same housing. Therefore, a plurality of devices housed in separate housings and connected via a network, and a single device with a plurality of modules housed in one housing are both systems.

The embodiments of the present technology are not limited to the above-described embodiments, and various modifications can be made without departing from the scope of the present technology.

For example, a form in which all or some of the plurality of embodiments described above are combined can be adopted.

For example, the present technology can have a cloud computing configuration in which one function is shared and processed in cooperation by a plurality of devices via a network.

Furthermore, each step described in the above-described flowchart can be executed by one device, and also shared and executed by a plurality of devices.

Moreover, in a case where one step includes a plurality of processes, the plurality of processes included in the one step can be executed by one device, and also shared and executed by a plurality of devices.

Note that the effects described in this specification are merely examples and are not limited, and effects other than those described in this specification may be present.

Note that the present technology can have the following configurations.

(1)

An artificial satellite including:

an imaging device configured to perform imaging of a predetermined region on ground; and a management unit configured to change accuracy of attitude control in accordance with a remaining battery amount at an imaging time that is instructed, and configured to change an imaging condition in accordance with accuracy of the attitude control.

(2)

The artificial satellite according to (1) described above, in which the management unit estimates a remaining battery amount at the imaging time from a current remaining battery amount and a charge amount to be accumulated by the imaging time.

(3)

The artificial satellite according to (1) or (2) described above, in which the management unit determines whether there is a predetermined remaining battery amount at the imaging time from a power consumption element related to imaging and a power consumption element of other than the imaging, and the management unit changes accuracy of the attitude control in a case where it is determined that there is not the predetermined remaining battery amount.

(4)

The artificial satellite according to (3) described above, in which the power consumption element related to the imaging also includes a remaining battery amount necessary for imaging scheduled after the imaging time.

(5)

The artificial satellite according to any one of (1) to (4) described above, in which the management unit determines whether it is possible to change a downlink timing in a case where it is determined that there is a predetermined remaining battery amount or less at the imaging time.

(6)

The artificial satellite according to any one of (1) to (5) described above, in which the management unit changes a range of a swing speed that is used for determining that a target attitude is obtained, as a change in accuracy of the attitude control.

(7)

The artificial satellite according to any one of (1) to (6) described above, in which the management unit changes a shutter speed as the imaging condition.

(8)

The artificial satellite according to any one of (1) to (7) described above, in which the management unit changes sensitivity as the imaging condition.

(9)

The artificial satellite according to any one of (1) to (8) described above, in which the artificial satellite performs imaging by flying while maintaining a relative relationship with another artificial satellite.

(10)

A control method for an artificial satellite, the control method including:

by an artificial satellite including an imaging device configured to perform imaging of a predetermined region on ground, changing accuracy of attitude control in accordance with a remaining battery amount at an imaging time that is instructed, and changing an imaging condition in accordance with accuracy of the attitude control.

REFERENCE SIGNS LIST

1 Satellite image processing system
11 Satellite group management device
13 Communication device
14 Antenna
15 Ground station (base station)
21 Satellite
31 Satellite group
41 Information providing server
42 Image analysis server
101 Management unit
111 Imaging device
211 Control unit
222 Control unit
231 Control unit
250 Event detection region
251 Transmission device
271 Transmission unit
272 Control unit
273 Sensor unit
291 Transmission device
292 Control device
293 Sensor
301 CPU
302 ROM
303 RAM
306 Input unit
307 Output unit
308 Storage unit
309 Communication unit
310 Drive

The invention claimed is:

1. An artificial satellite comprising:
an imaging device configured to perform imaging of a predetermined region on ground; and
a management unit configured to:
change accuracy of attitude control in accordance with a remaining battery amount at an imaging time that is instructed, and
change an imaging condition in accordance with the accuracy of the attitude control.

2. The artificial satellite according to claim 1, wherein
the management unit is further configured to estimate the remaining battery amount at the imaging time from a current remaining battery amount and a charge amount to be accumulated by the imaging time.

3. The artificial satellite according to claim 1, wherein the management unit is further configured to:
   determine whether there is a predetermined remaining battery amount at the imaging time from a power consumption element related to the imaging and a power consumption element of other than the imaging, and
   change the accuracy of the attitude control in a case where it is determined that there is not the predetermined remaining battery amount.

4. The artificial satellite according to claim 3, wherein the power consumption element related to the imaging also includes a remaining battery amount necessary for imaging scheduled after the imaging time.

5. The artificial satellite according to claim 1, wherein the management unit is further configured to determine whether it is possible to change a downlink timing in a case where it is determined that there is a predetermined remaining battery amount or less at the imaging time.

6. The artificial satellite according to claim 1, wherein the management unit is further configured to change a range of a swing speed that is used for determining that a target attitude is obtained, as the change in the accuracy of the attitude control.

7. The artificial satellite according to claim 1, wherein the management unit is further configured to change a shutter speed as the imaging condition.

8. The artificial satellite according to claim 1, wherein the management unit is further configured to change sensitivity as the imaging condition.

9. The artificial satellite according to claim 1, wherein the artificial satellite is configured to perform imaging by flying while maintaining a relative relationship with another artificial satellite.

10. A control method for an artificial satellite, the control method comprising:
   by the artificial satellite including an imaging device configured to perform imaging of a predetermined region on ground,
      changing accuracy of attitude control in accordance with a remaining battery amount at an imaging time that is instructed; and
      changing an imaging condition in accordance with the accuracy of the attitude control.

* * * * *